US012578690B2

(12) United States Patent
Rhodes et al.

(10) Patent No.: US 12,578,690 B2
(45) Date of Patent: Mar. 17, 2026

(54) SYSTEMS AND METHODS FOR ADAPTIVE ENVIRONMENTAL MONITORING WITH INTELLIGENT SAMPLING AND POWER MANAGEMENT

(71) Applicant: Kaiterra Limited, Grand Cayman (KY)

(72) Inventors: Vaughn Dixon Rhodes, Pleasant Grove, UT (US); Michael Paul Hasak, Mountain View, CA (US); Liam Robert Bates, Mollens (CH)

(73) Assignee: Kaiterra Limited, Grand Cayman (KY)

( * ) Notice: Subject to any disclaimer, the term of this patent is extended or adjusted under 35 U.S.C. 154(b) by 0 days.

(21) Appl. No.: 19/278,137

(22) Filed: Jul. 23, 2025

(65) Prior Publication Data

US 2026/0029755 A1      Jan. 29, 2026

Related U.S. Application Data

(60) Provisional application No. 63/674,729, filed on Jul. 23, 2024.

(51) Int. Cl.
*G05B 13/02*          (2006.01)

(52) U.S. Cl.
CPC ................................. *G05B 13/026* (2013.01)

(58) Field of Classification Search
CPC ...................................................... G05B 13/026
See application file for complete search history.

(56) References Cited

U.S. PATENT DOCUMENTS

| | | | | |
|---|---|---|---|---|
| 5,261,596 A | * | 11/1993 | Tachibana | ................ F24F 11/30 |
| | | | | 454/229 |
| 2006/0042960 A1 | * | 3/2006 | Tice | .................. G01N 33/0006 |
| | | | | 204/406 |
| 2008/0074254 A1 | * | 3/2008 | Townsend | ............... G01W 1/17 |
| | | | | 340/572.1 |
| 2017/0261951 A1 | | 9/2017 | Bandara et al. | |
| 2018/0177064 A1 | * | 6/2018 | van Pol | ................. G01M 3/246 |

(Continued)

FOREIGN PATENT DOCUMENTS

| | | |
|---|---|---|
| IN | 202441059804 A | 8/2024 |
| IN | 202541030163 A | 4/2025 |
| WO | 2024238923 A2 | 11/2024 |

OTHER PUBLICATIONS

International Search Report—PCT/US2025/038850—Date: Sep. 25, 2025—By: Authorized Officer Shane Thomas.

*Primary Examiner* — Nathan L Laughlin
(74) *Attorney, Agent, or Firm* — CALDWELL LLC

(57)          ABSTRACT

A system and method for adaptive environmental monitoring with intelligent sampling and power management are disclosed. The system includes at least a sensing device configured to monitor an environmental condition associated with at least a structure, wherein the at least a sensing device includes at least a sensor cluster including one or more device sensors, and a controller communicatively connected to the at least a sensing device, wherein the controller is configured to receive one or more device datasets from the at least a sensing device, wherein the one or more device datasets includes a sensor measurement, determine at least a sensor usage pattern as a function of the one or more device datasets, generate a power managing command as a function of the at least a sensor usage pattern, and execute the power managing command in the at least a sensing device.

18 Claims, 19 Drawing Sheets

(56) References Cited

U.S. PATENT DOCUMENTS

| | | |
|---|---|---|
| 2018/0259214 A1 | 9/2018 | Wilson et al. |
| 2021/0291614 A1* | 9/2021 | Liu ........................ B60H 1/008 |
| 2023/0160923 A1 | 5/2023 | Lee et al. |
| 2023/0228444 A1* | 7/2023 | Xiong ..................... F24F 11/30 |
| | | 700/276 |
| 2023/0229959 A1 | 7/2023 | Sinha |
| 2024/0000281 A1* | 1/2024 | Huang ................... G05D 1/241 |
| 2024/0129210 A1 | 4/2024 | Amini et al. |

* cited by examiner

200

208

228

204a

204b

400a

404

SYSTEMS AND METHODS FOR ADAPTIVE ENVIRONMENTAL MONITORING WITH INTELLIGENT SAMPLING AND POWER MANAGEMENT

CROSS-REFERENCE TO RELATED APPLICATIONS

This application claims the benefit of priority of U.S. Provisional Patent Application Ser. No. 63/674,729, filed on Jul. 23, 2024, and titled "Environmental Monitoring Systems and Methods," which is incorporated by reference herein in its entirety.

FIELD OF THE INVENTION

The present invention generally relates to the field of power management. In particular, the present invention is directed to a system and method for adaptive environmental monitoring with intelligent sampling and power management.

BACKGROUND

Conventional environmental monitoring systems have relied on distributed sensor networks mounted on or around structures, with each sensor node configured to measure a single environmental parameter at a fixed sampling rate. In these deployments, sensor clusters transmit raw measurements at predetermined intervals to a central processor. Power management is typically handled through predetermined duty-cycling or hardware sleep schedules that are independent of both the measured data patterns and any external context. Furthermore, maintaining large-scale sensor deployments often involves frequent manual servicing, including battery replacement and sensor recalibration, which can be labor-intensive and costly. Therefore, there exists a need for an improved environmental monitoring system that can adaptively manage sensing operations, reduce energy consumption and extend device lifespan.

SUMMARY OF THE DISCLOSURE

In some aspects, the techniques described herein relate to a system for adaptive environmental monitoring with intelligent sampling and power management, the system including at least a sensing device configured to monitor an environmental condition associated with at least a structure, wherein the at least a sensing device includes at least a sensor cluster including one or more device sensors, wherein the one or more device sensors are configured to measure one or more environmental phenomena, and at least a processor communicatively connected to the at least a sensing device, wherein the at least a processor is configured to receive one or more device datasets from the at least a sensing device, wherein the one or more datasets include a sensor measurement from each of the one or more device sensors, determine at least a sensor usage pattern as a function of the one or more device datasets, wherein determining the at least a sensor usage pattern includes detecting at least a measurement pattern as a function of the sensor measurement, retrieving reference data from one or more data sources, and determining the at least a sensor usage pattern as a function of the at least a measurement pattern and the reference data, generate a power managing command as a function of the at least a sensor usage pattern, wherein the power managing command is configured to modify at least a sensing parameter of at least one device sensor of the one or more device sensors, and execute the power managing command in the at least a sensing device.

In some aspects, the techniques described herein relate to a method for adaptive environmental monitoring with intelligent sampling and power management, the method including receiving, using at least a processor communicatively connected to at least a sensing device, one or more device datasets from the at least a sensing device, wherein the one or more device datasets include a sensor measurement from each of one or more device sensors of the at least a sensing device, and the at least a sensing device is configured to monitor an environmental condition associated with at least a structure, wherein the at least a sensing device includes at least a sensor cluster including the one or more device sensors, wherein the one or more device sensors is configured to measure one or more environmental phenomena, determining, using the at least a processor, at least a sensor usage pattern as a function of the one or more device datasets, wherein determining the at least a sensor usage pattern includes detecting at least a measurement pattern as a function of the sensor measurement retrieving reference data from one or more data sources, and determining the at least a sensor usage pattern as a function of the at least a measurement pattern and the reference data, generating, using the at least a processor, a power managing command as a function of the at least a sensor usage pattern, wherein the power managing command is configured to modify at least a sensing parameter of at least one device sensor of the one or more device sensors, and executing, using the at least a processor, the power managing command in the at least a sensing device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
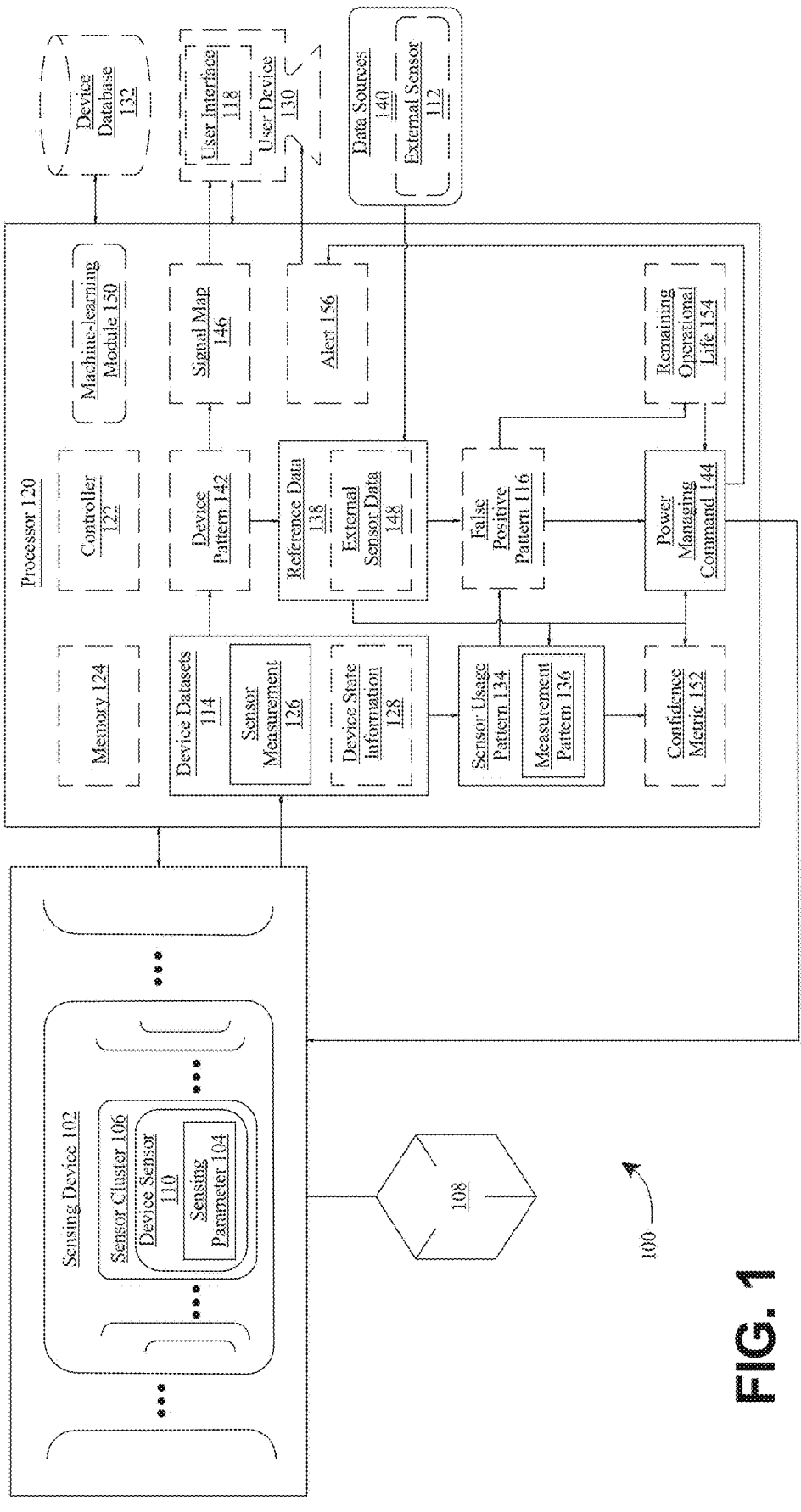
FIG. 1 illustrates a block diagram of an exemplary system for adaptive environmental monitoring with intelligent sampling and power management.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for adaptive environmental monitoring with intelligent sampling and power management, the system including at least a sensing device configured to monitor an environmental condition associated with at least a structure, wherein the at least a sensing device includes at least a sensor cluster including one or more device sensors, wherein the one or more device sensors are configured to measure one or more environmental phenomena, and at least a processor communicatively connected to the at least a sensing device, wherein the at least a processor is configured to receive one or more device datasets from the at least a sensing device, wherein the one or more datasets include a sensor measurement from each of the one or more device sensors, determine at least a sensor usage pattern as a function of the one or more device datasets, wherein determining the at least a sensor usage pattern includes detecting at least a measurement pattern as a function of the sensor measurement, retrieving reference data from one or more data sources, and determining the at least a sensor usage pattern as a function of the at least a measurement pattern and the reference data, generate a power managing command as a function of the at least a sensor usage pattern, wherein the power managing command is configured to modify at least a sensing parameter of at least one device sensor of the one or more device sensors, and execute the power managing command in the at least a sensing device.

For example, in various embodiments, sensors may be disposed in sensor clusters each of which includes 1, 2, 3, 4 or more sensors. The sensor clusters may include strategic combinations of sensors that enable selective sampling and averaging of data from individual sensors to improve measurement accuracy. Optionally, the sensor clusters may include a housing configured to interchangeably receive multiple sensors. Within each of the sensor clusters, the sensors may share a power source and/or communication circuits.

In some embodiments, a plurality of sensor clusters may be configured to communicate with a monitoring server, such as an internet based computing system. The monitoring server can include logic configured to facilitate adaptive sensor sampling to improve battery management of the sensor clusters. In various embodiments, the accuracy of environmental monitoring may be improved by selective sampling and averaging from specific sensor clusters as controlled by the monitoring server. In a specific example, sampling may be distributed among sensors of different sensor clusters so as to perform power management and battery lifetime across the plurality of sensor clusters.

Various embodiments may include an environmental monitoring system including an input configured to receive environmental data from a plurality of sensor clusters within a structure, each of the sensor clusters including two or more sensors each configured to generate different types of the environmental data, analysis logic configured to process the received environmental data to generate an environmental status output, sensor operation logic configured to determine an operation schedule for the sensors, the operation schedule being configured to optimize lifetime of the sensors, to automatically select sensors to be used in adaptive sampling, to manage a power source of each of the sensor clusters, and/or to optimize a replacement schedule for the sensor clusters; scheduling logic configured to generate scheduling data for each of the sensors, the scheduling data being based on the operation schedule, and an output configured to send scheduling data to each of the sensor clusters.

Various embodiments may include a method of performing environmental monitoring, the method including receiving environmental data from a first sensor of a plurality of sensors, processing the environmental data to detect a change in environmental conditions, generating an operation schedule for a second sensor of the plurality of sensors based on the change in environmental conditions, generating scheduling data for the second sensor based on the operation schedule, and sending the scheduling data to the second sensor to change a schedule for activation of the second sensor. Various embodiments may include method of performing environmental monitoring, the method comprising receiving environmental data from a first sensor of a plurality of sensors, receiving environmental data from a second sensor of a plurality of sensors, estimating a remaining lifetime of the first sensor, estimating a remaining lifetime of the second sensor, generating an operation schedule for the second sensor, based on the remaining lifetime of the first sensor and the remaining lifetime of the second sensor, the operation schedule being configured to reduce a difference between the remaining lifetime of the first sensor and the remaining lifetime of the second sensor, generating scheduling data for the second sensor based on the operation schedule, and sending the scheduling data to the second sensor to change a schedule for activation of the second sensor.

Exemplary embodiments illustrating aspects of the present disclosure are described below in the context of several specific examples.

Referring now to FIG. 1, an exemplary embodiment of system 100 for adaptive environmental monitoring with intelligent sampling and power management is illustrated. For the purposes of this disclosure, "adaptive environmental monitoring" is a process or system operation in which environmental conditions are monitored. In some cases, environmental conditions may be monitored using one or more sensing devices 102 whose sensing behavior is dynamically modified in response to internal or external inputs, such as sensor data patterns, system status, environmental variability, or predefined operational criteria as described further in detail below. Adaptive environmental monitoring differs from static monitoring. In some cases, adaptive environmental monitoring may incorporate feedback mechanisms that adjust sensing parameters 104 including sampling frequency, sensor activation schedules, data resolution, or power usage based on real-time analysis of environmental trends, sensor reliability, signal quality, or resource constraints as described further in detail below. In some cases, system 100 may optimize data accuracy, power efficiency, system lifespan, or responsiveness to environmental changes, while minimizing redundancy, false readings, or maintenance complexity.

With continued reference to FIG. 1, system 100 includes at least a sensing device 102. For the purposes of this disclosure, a "sensing device" is a device configured to monitor an environmental condition associated with at least a structure. In some cases, sensing device 102 may include at least one sensor or sensor cluster 106, associated circuitry for signal acquisition and processing, communication interface for data transmission, power source, extension cable, cable port, antenna, universal serial bus (USB) port, power cable, power switch, ventilation mechanism, and the like. In some cases, sensing device 102 may operate autonomously or as part of a distributed network. In some cases, sensing device 102 may include functionality for data preprocessing, calibration, self-diagnostics, and communication with other sensing devices 102 or a central system. Exemplary sensing device 102 is illustrated in FIGS. 2A-D.

With continued reference to FIG. 1, for the purposes of this disclosure, a "structure" is a physical entity, space, or built environment. In some cases, one or more sensing devices 102 may be deployed within or around a structure 108 to monitor an environmental condition. As a non-limiting example, structure 108 may include residential buildings, commercial facilities, industrial sites, transportation systems, infrastructure elements, or enclosed or semi-enclosed architectural environments. As another non-limiting example, structure 108 may include a single room or space. For example, and without limitation, structure 108 may include a vehicle, building, or section thereof. For example, and without limitation, structure 108 may include an orbital satellite, an aircraft, a ship, an underground mine, an office building or a factory. In some cases, structures 108 may not necessarily be limited to being indoors. For example, and without limitation, structure 108 may include a parking lot, a city park, a stadium, a railroad, a roadway, and the like. In some cases, structure may provide the spatial context in which environmental phenomena, such as air quality, temperature, humidity, light, occupancy, or signal strength as described in detail below, are monitored. In some cases, system 100 may include one sensing device 102 installed within or around a structure 108. For example, and without limitation, an office room may have one sensing device 102 installed on a wall. In some cases, system 100 may include a plurality of sensing devices 102 installed within or around a structure 108. For example, and without limitation, a building may have two sensing devices 102 installed on a first floor and five sensing devices 102 installed on a second floor. In some cases, sensing device 102 may be installed within a structure 108 by physically mounting or positioning the sensing device 102 at a selected location that enables optimal monitoring of the intended environmental conditions. In some cases, sensing device 102 may be affixed to a wall, ceiling, fixture, or enclosed housing. In some cases, sensing device 102 may be affixed on a surface using mechanical fasteners, adhesive mounts, brackets, or integrated structural interfaces.

With continued reference to FIG. 1, for the purposes of this disclosure, an "environmental condition" is any measurable physical, chemical, or atmospheric parameter present within or around a structure. As a non-limiting example, environmental conditions may include air quality metrics (e.g., concentrations of gases, particulates, or volatile compounds), temperature, humidity, pressure, light levels, sound, occupancy, motion, and electromagnetic signal strength. Environmental conditions may vary spatially and temporally. Environmental conditions may be influenced by external events, human activity, mechanical systems, or natural processes.

With continued reference to FIG. 1, sensing device 102 includes at least a sensor cluster 106. For the purposes of this disclosure, a "sensor cluster" is a modular sensor compartment that includes two or more sensors housed within a single, physically detachable unit. In some cases, sensor cluster 106 may be configured to be installed in or removed from a sensing device 102. In some cases, sensor cluster 106 may function as a detachable module that physically and electrically interfaces with a sensing device 102 through a connector or port. In some cases, sensor cluster 106 may enable users to customize a sensing device 102 by selecting sensor combinations suited to specific monitoring needs. In a non-limiting example, sensor cluster 106 may be removably inserted into a socket within a sensing device 102. For the purposes of this disclosure, "removably inserted" refers to an object that has been inserted or placed an into another object such that the object can be removed from the other object without causing damage or leaving any residue behind. In some cases, sensor cluster 106 may be fixedly attached to a sensing device 102. For the purposes of this disclosure, "fixed attachment" refers to something that is permanently attached, secured, or affixed in a way that it cannot be detached or removed. In some cases, sensing device 102 may include a single sensor cluster 106. In some cases, sensing device 102 may include multiple sensor clusters 106. For example, and without limitation, sensing device 102 may include two sensor clusters 106. For example, and without limitation, sensing device 102 may include four sensor clusters 106. In a non-limiting example, sensing device 102 may include multiple sensor clusters 106, each of which configured to monitor different environmental phenomena.

With continued reference to FIG. 1, sensor cluster 106 includes one or more device sensors 110, wherein the one or more device sensors 110 is configured to measure a plurality of different environmental phenomena. For the purposes of this disclosure, a "sensor" is a device that produces an output signal for the purpose of sensing a physical phenomenon. For example, and without limitation, the at least a sensor may transduce a detected phenomenon into a sensed signal. Sensor may output the sensed signal. Sensor may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by a sensor may include circuitry, computing devices, electronic components or a combination thereof that translates into at least an electronic signal configured to be transmitted to another electronic component.

With continued reference to FIG. 1, for the purposes of this disclosure, a "device sensor" is a sensing element integrated into or associated with a sensing device. As a non-limiting example, device sensor 110 may include sensors for measuring parameters such as temperature, humidity, air quality, gas concentration, light strength (lux), light spectrum, airborne particles, sound levels, motion, or other physical, chemical, or atmospheric conditions. For example, and without limitation, device sensor 110 may detect $PM_1$, $PM_{2.5}$, $PM_{10}$, volatile organic compounds (VOCs), carbon dioxide ($CO_2$), nitrogen dioxide ($NO_2$), carbon monoxide (CO), ozone ($O_3$), occupancy, air pressure, and the like. In some embodiments, multiple device sensors 110 may be grouped into a sensor cluster 106 to enable multi-modal sensing. In some cases, a device sensor 110 may function independently. For example, and without limitation, sensing device 102 may simultaneously collect more than fifteen different sensor measurements. In some cases, a device sensor 110 may be in coordination with external sensors 112. The external sensors 112 are described further in detail below. In some cases, a single sensor cluster 106 may include one or more device sensors 110 configured to detect a same environmental phenomenon. In some cases, a single sensor cluster 106 may include one or more device sensors 110 configured to detect different environmental phenomena. For example, and without limitation, sensor cluster 106 may include a temperature sensor configured to monitor ambient temperature, a humidity sensor configured to measure relative humidity, a particulate matter sensor configured to detect airborne particles such as $PM_{2.5}$, and a gas sensor configured to detect the concentration of $NO_2$. In some embodiments, sensor cluster 106 may include redundant device sensors 110. In some embodiments, sensor cluster 106 may include device sensors 110 measuring the same phenomena, but in different locations. In some embodiments, each of one or more device sensors 110 may be configured to measure a different environmental phenomenon. Device sensor 110 is further described in detail with respect to FIG. 6.

With continued reference to FIG. 1, as a non-limiting example, device sensor 110 may include a particular matter sensor, total volatile organic compounds (TVOC) sensor, $CO_2$ sensor, temperature sensor, relative humidity sensor, $O_3$ sensor, CO sensor, $NO_2$ sensor, occupancy sensor, light sensor, and the like. For the purposes of this disclosure, a "particulate matter sensor" is a device sensor configured to detect and measure the concentration of airborne solid or liquid particles suspended in the atmosphere. Particulate matter sensors may detect particles within defined size ranges, such as PM1.0, PM2.5, or PM10, where the numerical value corresponds to the particle diameter in micrometers. As a non-limiting example, particulate matter sensor may include a laser particle sensor. In some cases, particulate matter sensors may operate using optical methods such as light scattering or laser-based detection, wherein a light beam is directed through an air sample and the scattered light is measured to determine particle concentration and size distribution. The particulate matter sensor may be integrated within a sensor cluster 106 or operate independently to provide real-time measurements of air quality within a structure 108.

With continued reference to FIG. 1, for the purposes of this disclosure, a "total volatile organic compounds sensor" is a device sensor configured to detect and quantify a collective concentration of volatile organic compounds present in the air of a structure. Volatile organic compounds are a class of carbon-based gases emitted from various sources such as cleaning products, paints, building materials, combustion processes, and biological activity. A TVOC sensor may measure an overall concentration of TVOC in parts per billion (ppb) or parts per million (ppm) rather than identifying individual chemical species. TVOC sensors may operate using metal-oxide semiconductor (MOS), photoionization detection (PID), or infrared absorption technologies, where the presence of VOCs induces a measurable change in the sensor's electrical or optical properties. As a non-limiting example, TVOC sensor may include multi-pixel metal oxide sensor (MOx). TVOC sensor may be integrated into a sensor cluster 106 or deployed individually within a sensing device 102, With continued reference to FIG. 1, for the purposes of this disclosure, a "carbon dioxide sensor" is a device sensor configured to detect and measure a concentration of carbon dioxide gas present in the air of a structure. As a non-limiting example, $CO_2$ sensor may include non-dispersive infrared (NDIR). In some cases, infrared light may be passed through an air sample and the amount of light absorbed at a specific wavelength corresponding to $CO_2$ may be measured to determine its concentration. $CO_2$ sensor may be integrated into a sensor cluster 106 or operate independently within a sensing device 102.

With continued reference to FIG. 1, for the purposes of this disclosure, a "temperature sensor" is a device that detects thermal energy and outputs an electrical signal as a function of the detection of thermal energy. As a non-limiting example, the temperature sensor may include thermocouples, thermistors, thermometers, passive infrared sensors, resistance temperature sensors (RTD's), semiconductor based integrated circuits (IC), a combination thereof or another undisclosed sensor type, alone or in combination. For the purposes of this disclosure and as would be appreciated by someone of ordinary skill in the art, "temperature" is a measure of the heat energy of a system. Temperature, as measured by any number or combinations of sensors, may be measured in Fahrenheit ($^\circ$ F.), Celsius ($^\circ$ C.), Kelvin ($^\circ$ K), or another scale alone or in combination. The temperature measured by sensors may comprise electrical signals which are transmitted to their appropriate destination wireless or through a wired connection.

With continued reference to FIG. 1, "pressure," for the purposes of this disclosure, and as would be appreciated by someone of ordinary skill in the art, is a measure of force required to stop a fluid from expanding and is usually stated in terms of force per unit area. The pressure sensor that may be included in at least a sensor may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressor sensor may include a barometer. In some embodiments, the pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal.

With continued reference to FIG. 1, for the purposes of this disclosure, a "relative humidity sensor" is a device sensor configured to detect and measure the relative humidity of the air within a structure. "Relative humidity" is a ratio, expressed as a percentage, of the current amount of water vapor in the air to the maximum amount of water vapor the air can hold at a given temperature. "Humidity," as used in this disclosure, is the property of a gaseous medium (almost always air) to hold water in the form of vapor. In one or more embodiments, at least a sensor may include electrical sensors. Electrical sensors may be configured to measure voltage across a component, electrical current through a component, and resistance of a component. In one or more embodiments, at least a sensor may include thermocouples, thermistors, thermometers, infrared sensors, resistance temperature sensors (RTDs), semiconductor based integrated circuits (ICs), a combination thereof, or another undisclosed sensor type, alone or in combination.

With continued reference to FIG. 1, for the purposes of this disclosure, an "ozone sensor" is a device sensor configured to detect and measure the concentration of ozone gas in the air within a structure. Ozone sensors may operate using electrochemical, metal oxide semiconductor (MOS), or ultraviolet absorption technologies. In electrochemical configurations, ozone sensor may generate an electrical signal proportional to the amount of ozone reacting at the sensor's electrode. Ozone sensor may be integrated into a sensor cluster 106 or deployed individually within a sensing device 102. Ozone sensors may exhibit cross-sensitivity to nitrogen dioxide. In a non-limiting example, ozone sensor may respond not only to ozone, but also to the presence of $NO_2$ in the environment. This cross-sensitivity can arise because $NO_2$ and $O_3$ are both strong oxidizing agents and can induce similar electrochemical or surface reactions on the ozone sensor's active sensing layer, thereby producing overlapping or indistinguishable signal responses. In some cases, $NO_2$ sensor may be used in conjunction with ozone sensor to resolve the cross-sensitivity effects.

With continued reference to FIG. 1, for the purposes of this disclosure, a "nitrogen dioxide sensor" is a device sensor configured to detect and measure the concentration of nitrogen dioxide gas in the air within a structure. $NO_2$ sensors may operate using electrochemical, metal oxide semiconductor (MOS), or optical sensing technologies. In some cases, $NO_2$ sensor may detect the presence of $NO_2$ in the air within a structure 108. In some cases, $NO_2$ sensor may produce an electrical current proportional to the amount of $NO_2$ gas that undergoes a redox reaction at the sensor's electrode. $NO_2$ sensor may be integrated into a sensor cluster 106 or function independently within a sensing device 102. In some cases, device dataset 114 from $NO_2$ sensor may be used in conjunction with other gas sensors (e.g., ozone sensor) to resolve cross-sensitivity effects (e.g., false positive pattern 116) and/or validate pollutant events as described further in detail below.

With continued reference to FIG. 1, for the purposes of this disclosure, an "occupancy sensor" is a device sensor configured to detect the presence or absence of individuals within a structure. In some cases, occupancy sensor may operate using technologies such as passive infrared (PIR), ultrasonic, microwave, or time-of-flight sensing. In some cases, occupancy sensor may be used to determine motion, human presence, or changes in thermal signature indicative of occupancy.

With continued reference to FIG. 1, a "light sensor," for the purposes of this disclosure, is a device sensor configured to measure ambient light intensity within a monitored space.

In some cases, light sensor may operate using photodiodes, phototransistors, or other optical sensing technologies that convert light levels into electrical signals. In some cases, measured data may be expressed in units such as lux. In some cases, light sensor may be used to assess lighting conditions, control system behavior based on natural or artificial lighting, or support context-aware environmental analysis.

With continued reference to FIG. 1, in some cases, device sensor 110 may include electrical sensors. As described in this disclosure, an "electrical sensor" is a device that is configured to detect an electrical parameter associated with an electrical phenomenon. Exemplary non-limiting electrical sensors include volt-meters, amp-meters, ohm-meters, multi-meters, oscilloscopes, and the like. In some cases, device sensor 110 may include a mechanical sensor. As used in this disclosure, a "mechanical sensor" is a device that is configured to detect a mechanical parameter associated with a mechanical phenomenon. Exemplary non-limiting mechanical sensors include load cells, strain gauges, motion sensors (e.g., inertial measurement units, accelerometers, gyroscopes, and the like) vibrometers, and the like. In some cases, device sensor 110 may include an optical sensor. As described in this disclosure, an "optical sensor" is a device that is configured to detect an optical phenomenon. Exemplary non-limiting optical sensors include photodetectors, photodiodes, pyrometers, cameras, image sensors (e.g., CMOS and CCD), and the like.

With continued reference to FIG. 1, in some cases, device sensor 110 may monitor voltage and/or temperature of battery modules and/or cells of at least a battery of power source of sensing device 102. In some cases, device sensor 110 may be configured to detect failure within each battery module, for instance and without limitation, as a function of and/or using detected physical and/or electrical parameters. In some embodiments, device sensor 110 may detect voltage of power source of sensing device 102. Detection may be performed using any suitable component, set of components, and/or mechanism for direct or indirect measurement and/or detection of voltage levels analog to digital converters, any form of voltmeter, or the like.

With continued reference to FIG. 1, in some cases, sensing device 102 may include a power source. For the purposes of this disclosure, a "power source" is any component or system that supplies electrical energy to a sensing device. As a non-limiting example, power source may include a non-rechargeable battery, rechargeable battery, solar panel, wired connection to an external power grid or electrical system of a structure 108, or the like. In a non-limiting example, a sensing device 102 may be powered using USB-C. In some cases, device sensor 110 may consume energy from a power source to perform its sensing operations. When a sensing device 102 is in operation, electrical energy supplied by a power source may be directed to at least a device sensor 110 through internal power management circuitry. In some cases, the amount of energy consumed by device sensor 110 may vary depending on its sensing modality, measurement frequency, operational duty cycle, and specific environmental phenomenon being monitored. In some cases, energy drawn by device sensor 110 may be reduced by adjusting its sampling rate or temporarily disabling the device sensor 110 during periods of environmental stability or redundancy, thereby optimizing overall power efficiency of the sensing device 102 as described further in detail below.

With continued reference to FIG. 1, in some cases, sensor cluster 106 may include a unique identifier. For the purposes of this disclosure, a "unique identifier" is an identifier that is unique for an object among others. As a non-limiting example, unique identifier may include a universal product code (barcode, quick response (QR) code, and the like), radio-frequency identification (RFID), a unique sequencing of alpha-numeric symbols, or anything of the like that can be used to identify sensor cluster 106. For the purposes of this disclosure, a "universal product code" is a method of representing data in a visual, machine-readable form. In an embodiment, the universal product code may include linear barcode. For the purposes of this disclosure, "linear barcode," also called "one-dimensional barcode" is a barcode that is made up of lines and spaces of various widths or sizes that create specific patterns. In another embodiment, the universal product code may include matrix barcode. For the purposes of this disclosure, "matrix barcode," also called "two-dimensional barcode" is a barcode that is made up of two dimensional ways to represent information. As a non-limiting example, the matrix barcode may include QR code, and the like. Unique identifier may take the form of any identifier that uniquely corresponds to the purposes of system 100; this may be accomplished using methods including but not limited to Globally Unique Identifiers (GUIDs), Universally Unique Identifiers (UUIDs), or by maintaining a data structure, table, or database listing all transmitter identifiers and checking the data structure, table listing, or database to ensure that a new identifier is not a duplicate. In an embodiment, unique identifier may include a printed form. As a non-limiting example, unique identifier may be printed and sticked on a sensor cluster 106. In another embodiment, unique identifier may include a digital form. As a non-limiting example, a user may find unique identifier of a sensor cluster 106 on a user interface 118, phone screen, tablet, computer screen, or any display device thereof. In some cases, unique identifier (e.g., QR code) may provide a machine-readable reference that can be scanned using a mobile device, diagnostic tool, or integrated reader to retrieve detailed information from local memory or a database. For example, and without limitation, by scanning unique identifier, a user may obtain information such as a type and number of device sensors 110 contained within a sensor cluster 106, sensor serial numbers, manufacturing information, calibration dates, calibration method, sensor-specific correction factors, firmware versions, environmental parameter specifications, and the like.

With continued reference to FIG. 1, system 100 includes a processor 120. For the purposes of this disclosure, a "processor" is an electronic component or processing unit configured to manage, coordinate, and execute operations within a system. Processor 120 may be configured for data acquisition, signal processing, communication, and power management. In some cases, processor 120 can be local to sensing device 102. In a non-limiting example, when a processor 120 is local, processor 120 may be physically integrated within a sensing device 102 and may directly interface with sensors, memory, communication modules, and power management components. In some cases, processor 120 may be external to a sensing device 102 and located remotely, such as within a central processing unit, a network gateway, a cloud server, or a mobile device. In a non-limiting example, sensing device 102 may transmit raw or partially processed device datasets 114 to an external processor 120 using a wired or wireless communication interface. In some cases, processor 120 may be communicatively connected to one or more devices (e.g., sensing devices 102, data sources, databases, computing devices, controllers, other processors, and the like) by way of one or more networks. The network may include, but is not limited to, a cloud network, peer-to-peer network, a mesh network, a local area network (LAN), and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which a processor connects directly, dynamically, and non-hierarchically to as many other computing devices as possible. For example, and without limitation, each sensing device 102 may function as a node that is communicatively connected to one or more other nodes within the same network, enabling decentralized communication and control. In some cases, each node in a mesh network may exchange data, relay messages, and coordinate operations directly with neighboring devices. A "network topology" as used in this disclosure is an arrangement of elements of a communication network. In some embodiments, at least a portion of processing may be performed at a network edge, such as directly on sensing devices 102 or on intermediary edge computing nodes.

With continued reference to FIG. 1, in some cases, processor 120 may include a controller 122. For the purposes of this disclosure, Processor 120 may include a circuitry, such as without limitation, a processor 120 and/or controller 122 communicatively connected to a memory 124; for instance, circuitry may include and/or be included in a computing device. Processor 120 may include any computing device as described in this disclosure, including without limitation a microcontroller, microprocessor, digital signal processor (DSP) and/or system on a chip (SoC) as described in this disclosure. Processor 120 may include, be included in, and/or communicate with a mobile device such as a mobile telephone or smartphone. Processor 120 may include a single computing device operating independently, or may include two or more computing device operating in concert, in parallel, sequentially or the like; two or more computing devices may be included together in a single computing device or in two or more computing devices. Processor 120 may interface or communicate with one or more additional devices as described below in further detail via a network interface device. Network interface device may be utilized for connecting processor 120 to one or more of a variety of networks, and one or more devices. Examples of a network interface device include, but are not limited to, a network interface card (e.g., a mobile network interface card, an LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 120 may include but is not limited to, for example, a computing device or cluster of computing devices in a first location and a second computing device or cluster of computing devices in a second location. Processor 120 may include one or more computing devices dedicated to data storage, security, distribution of traffic for load balancing, and the like. Processor 120 may distribute one or more computing tasks as described below across a plurality of computing devices of computing device, which may operate in parallel, in series, redundantly, or in any other manner used for distribution of tasks or memory between computing devices. Processor 120 may be implemented, as a non-limiting example, using a "shared nothing" architecture.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 120 and/or processor 120 may be designed and/or configured to perform any method, method step, or sequence of method steps in any embodiment described in this disclosure, in any order and with any degree of repetition. For instance, processor 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 120 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 120 is configured to receive one or more device datasets 114 from at least a sensing device 102. For the purposes of this disclosure, "device datasets" are collections of data associated with a sensing device or at least a component of the sensing device. One or more device datasets 114 includes a sensor measurement 126 from each of one or more device sensors 110. For the purposes of this disclosure, a "sensor measurement" is a signal output generated by a sensor in response to detecting a specific environmental phenomenon or condition. In some cases, sensor measurement 126 may include quantitative or qualitative observation of a parameter such as temperature, humidity, gas concentration, particulate matter level, light intensity, motion, or other measurable properties within or around a structure 108. In some cases, sensor measurement 126 may be expressed in physical units (e.g., degrees Celsius, parts per million, lux, and the like). For example, and without limitation, sensor measurements 126 may include temperature values detected by a temperature sensor, such as ambient air temperature, relative humidity values measured by a humidity sensor, particulate matter concentration levels measured by a particulate matter sensor, such as PM2.5, carbon dioxide concentration levels measured by a $CO_2$ sensor, and total volatile organic compound (TVOC) levels measured by a TVOC sensor. For example, and without limitation, sensor measurements 126 may include ozone concentration levels measured by an ozone sensor, nitrogen dioxide concentration levels measured by an $NO_2$ sensor, light intensity levels measured by a light sensor, and occupancy status measured by an occupancy sensor, which may output a binary signal representing presence or absence. In some cases, sensor measurement 126 may undergo preprocessing such as filtering, calibration adjustment, or normalization. In some cases, sensor measurement 126 may be time-stamped and may be stored, transmitted, or analyzed as part of a device dataset 114.

With continued reference to FIG. 1, in some cases, device datasets 114 may include device state information 128. For the purposes of this disclosure, "device state information" is data that characterizes operational parameters of a sensing device or any components of the sensing device. In some cases, device state information 128 may include information related to a current functional condition, performance status, and health of a sensing device 102. As a non-limiting example, device state information 128 may include battery level, power consumption rate, internal temperature, memory availability, processor utilization, connectivity strength (e.g., signal quality or network status), uptime duration, firmware version, and error or fault codes. In some cases, device state information 128 may include information related to a current functional condition, performance status, and health of each device sensor of one or more device sensors 110 and/or sensor cluster 106. As a non-limiting example, device state information 128 of a device sensor 110 may include sensor calibration status, signal stability, internal temperature, power usage, operational time, failure indicators, and self-diagnostic results.

With continued reference to FIG. 1, in some embodiments, processor 120 may receive device datasets 114 from a user device 130. For the purposes of this disclosure, a "user device" is any device a user use to input data. As a non-limiting example, user device 130 may include a laptop, desktop, tablet, mobile phone, smart phone, smart watch, kiosk, screen, smart headset, or things of the like. For the purposes of this disclosure, a "user" is an individual or entity that interacts with, configures, monitors, or receives information from system 100. As a non-limiting example, user may include system operators, technicians, building occupants, facility managers, or remote administrators, and the like. In some embodiments, user device 130 may include an interface (e.g., user interface 118) configured to receive inputs from a user. In some embodiments, a user may manually input any data (e.g., device datasets 114, user input, external sensor 112, or any data associated with device sensor 110 and sensing device 102) into system 100 using user device 130. In some embodiments, a user may have a capability to process, store or transmit any information independently.

With continued reference to FIG. 1, in some embodiments, processor 120 may receive device datasets 114 from a device database 132. As used in this disclosure, a "device database" is a data structure configured to store data associated with a sensing device. As a non-limiting example, device database 132 may store device datasets 114, user input, external sensor 112, or any data associated with device sensor 110 and sensing device 102. In one or more embodiments, device database 132 may include inputted or calculated information and datum related to sensing device 102. In some embodiments, a datum history may be stored in device database 132. As a non-limiting example, the datum history may include real-time and/or previous inputted data related to a sensing device 102. As a non-limiting example, device database 132 may include instructions from a user, who may be an expert user, a past user in embodiments disclosed herein, or the like, where the instructions may include examples of the data related to sensing device 102.

With continued reference to FIG. 1, in some embodiments, processor 120 may be communicatively connected with device database 132. For example, and without limitation, in some cases, device database 132 may be local to processor 120. In another example, and without limitation, device database 132 may be remote to processor 120 and communicative with processor 120 by way of one or more networks as described in this disclosure.

With continued reference to FIG. 1, in some embodiments, device database 132 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, processor 120 is configured to determine at least a sensor usage pattern 134 as a function of one or more device datasets 114. For the purposes of this disclosure, a "sensor usage pattern" is a degree of uniformity or stability in sensor measurements of one or more device sensors. In some cases, sensor usage pattern 134 may indicate a degree of uniformity or stability in sensor measurements of one or more device sensors 110 either within a single sensing device 102 over time or across multiple sensing devices 102 monitoring the same environmental phenomenon. In some cases, sensor usage pattern 134 may reflect whether the measurements (sensor measurement 126) of a given device sensor 110 are consistent, stable, uniform or predictable. As a non-limiting example, a sensor usage pattern 134 may be determined when temperature measurements from a device sensor 110 remain within a narrow range over an extended period of time, indicating a stable thermal environment and in this case, processor 120 may classify the sensor usage pattern 134 as low-variability or stable. In some embodiments, sensor usage pattern 134 may be determined individually for each device sensor 110 within a sensing device 102, or across multiple sensing devices 102 monitoring the same environmental phenomenon, depending on the observed stability in corresponding sensor measurements 126. In some cases, sensor usage pattern 134 may be stored in a device database 132 and processor 120 may retrieve sensor usage pattern 134 from the device database 132. In some cases, user may manually input sensor usage pattern 134.

With continued reference to FIG. 1, processor 120 is configured to detecting at least a measurement pattern 136 as a function of sensor measurement 126. For the purposes of this disclosure, a "measurement pattern" is a dynamic or anomalous behavior detected in sensor measurements of one or more device sensors over time. In some cases, measurement pattern 136 may be used to preemptively adapt measurement frequency based on known external environmental threats, interpret environmental conditions, detect anomalies, or inform adaptive control decisions. As a non-limiting example, measurement pattern 136 may include sudden spikes, abrupt increases or decreases, irregular fluctuations, or transient events that indicate the presence of an environmental change, activity, or disturbance. In some cases, measurement patterns 136 may be used to identify unusual or meaningful variations in environmental conditions, such as occupancy events, pollutant spikes, or rapid changes in temperature or humidity. For example, and without limitation, a measurement pattern 136 may include sudden changes in sensor measurements 126, such as an abrupt elevation or decline in gas concentration, temperature, or particulate matter levels. For instance, and without limitation, measurement pattern 136 may reflect a rapid increase in PM2.5 concentration within a short time interval, indicating the onset of a localized pollution event. For instance, and without limitation, measurement pattern 136 may include a sudden drop in ozone levels potentially due to ventilation activation or a change in external air quality. In some cases, measurement patterns 136 may include statistical characteristics such as variance, rate of change, correlation between sensor types, or consistency with known environmental baselines. In some embodiments, measurement patterns 136 may be used to identify conditions such as pollution events, signal spikes, abnormal sensor behavior, or environmental stability. In some cases, determining a measurement pattern 136 may include filtering, averaging, modeling, or machine learning techniques to raw device datasets 114 and/or sensor measurements 126. In some cases, measurement pattern 136 may be stored in a device database 132 and processor 120 may retrieve measurement pattern 136 from the device database 132. In some cases, user may manually input measurement pattern 136. In some cases, when an unusual or significant measurement pattern 136 is detected, system 100 may temporarily increase a measurement frequency (sensing parameter 104) of one or more device sensors 110 to capture high-resolution data, improve event characterization, or enhance detection accuracy.

With continued reference to FIG. 1, detecting at least a measurement pattern 136 includes retrieving reference data 138 from one or more data sources 140. In some cases, determining at least a sensor usage pattern 134 may include identifying a false positive pattern 116 in the at least a measurement pattern 136 as a function of the reference data 138. For the purposes of this disclosure, "reference data" is information or data previously collected from a device sensor within a sensing device or data collected from other similar or identical devices within a network, or data originates from one or more external data sources. For the purposes of this disclosure, a "data source" is a component, system, device, or service that provides data to a system 100. As a non-limiting example, data source 140 may include one or more other identical or similar devices within a system's network. For example, and without limitation, a sensing device located in one room of a building may serve as a data source 140 for another sensing device in a different room by providing relevant environmental measurements as reference data 138. For example, and without limitation, reference data 138 may include data previously collected from sensing device 102.

With continued reference to FIG. 1, in some cases, data sources 140 may include external data sources. For the purposes of this disclosure, an "external data source" is any data provider or system located outside a sensing device. In some embodiments, processor 120 may retrieve data set from web sources using a web crawler. In some cases, external data source may include websites, web pages, online databases, public or private APIs, social media platforms, forums, blogs, and news websites. As a non-limiting example, external data source may include publicly available platforms such as government-operated air quality monitoring stations, meteorological services, wildfire alert systems, news feeds, environmental application programming interfaces (APIs), or cloud-based data repositories. As a non-limiting example, external data source may include external sensors 112, distributed sensor networks, or the like that are not physically integrated into a sensing device 102 but are communicatively accessible through a network connection. In a non-limiting example, reference data 138 may include data retrieved from external data source such as government air quality databases, public environmental monitoring stations, meteorological services, or external sensors 112 located outside a structure 108. For example, and without limitation, reference data 138 may include regional air quality indices published by government monitoring stations or weather data from meteorological services. For example, and without limitation, reference data 138 may include wildfire alerts published by environmental agencies. In some cases, reference data 138 may be stored in a device database 132 and processor 120 may retrieve reference data 138 from the device database 132. In some cases, user may manually input reference data 138.

With continued reference to FIG. 1, for the purposes of this disclosure, an "external sensor" is a sensor located outside the housing of a sensing device 102. In some cases, external sensor 112 may be installed on a separate enclosure, mounted elsewhere within a structure 108, or positioned in an adjacent or outdoor location. In some cases, external sensor 112 may be connected to sensing device 102 using antenna, USB port, Wi-Fi, Bluetooth, and the like. For example, and without limitation, external sensors 112 may include a rooftop-mounted particulate matter sensor, a government-operated roadside nitrogen dioxide sensor, or a weather station humidity sensor connected via a network interface.

With continued reference to FIG. 1, in some embodiments, reference data 138 may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 120 may generate web crawler to scrape reference data 138 from data sources 140. The web crawler may be seeded and/or trained with a reputable website to begin the search. Web crawler may be generated by processor 120. In some embodiments, web crawler may be trained with information received from user through a user interface. In some embodiments, web crawler may be configured to generate a web query. A web query may include search criteria received from user. For example, user may submit a plurality of websites for web crawler to search to reference data 138. Additionally, web crawler function may be configured to search for and/or detect one or more data patterns. A "data pattern" as used in this disclosure is any repeating forms of information. In some embodiments, web crawler may be configured to determine the relevancy of a data pattern. Relevancy may be determined by a relevancy score. A relevancy score may be automatically generated by processor 120, received from a machine learning model, and/or received from user. In some embodiments, a relevancy score may include a range of numerical values that may correspond to a relevancy strength of data received from a web crawler function. As a non-limiting example, a web crawler function may search the Internet for reference data 138 related to user.

With continued reference to FIG. 1, in some cases, retrieving reference data 138 may include aggregating one or more device datasets 114 for an initialization period from at least a sensing device 102, identifying at least a device pattern 142 associated with the at least a sensing device 102 as a function of the plurality of aggregated device datasets 114 and generating the reference data 138 as a function of the at least a device pattern 142. For the purposes of this disclosure, an "initialization period" is a time window during which a system collects baseline sensor data set. In some cases, duration of initialization period may be preconfigured. For example, and without limitation, duration of initialization period may include a fixed number of hours or days. In some cases, duration of initialization period may be dynamically determined based on the quantity or stability of incoming data. Once the initialization period concludes, the resulting baseline information may be stored in a device database 132 or referenced as part of the system's ongoing adaptive logic as reference data 138. In some cases, initialization period may begin when a sensing device 102 is first deployed, powered on, reset, or integrated into a system 100 or structure 108. As a non-limiting example, during an initialization period of a newly installed sensing device 102 in a structure 108, processor 120 may collect continuous temperature, humidity, and particulate matter measurements for a period of 48 hours. Over this time, the processor 120 may observe that temperature readings remain within a narrow range, humidity exhibits a mild daily fluctuation, and particulate matter levels remain consistently low. Based on these observations, the processor 120 may establish device pattern 142 for each environmental phenomenon and classify the temperature and particulate matter sensors as monitoring stable conditions (e.g., reference data 138).

With continued reference to FIG. 1, for the purposes of this disclosure, a "device pattern" is a representation of characteristics associated with one or more sensing devices. As a non-limiting example, device pattern 142 may include patterns in signal strength, sensor performance consistency, device response behavior, or environmental stability in a physical location of sensing device 102. For example, and without limitation, a device pattern 142 may reflect that a particular sensing device 102 consistently reports uniform temperature levels, low variance in air quality data, or intermittent communication signals due to its placement within structure 108. In some cases, processor 120 may be configured to identify offline sensing devices 102 or device sensors 110 and low signal strength and fill them using data from nearby device sensors 110. In some cases, processor 120 may determine a device pattern 142 during an initialization period. In some cases, processor 120 may determine a device pattern 142 as part of ongoing system operation. In some cases, processor 120 may use device pattern 142 to generate reference data 138, detect anomalies, evaluate device reliability, or adjust sensing parameters 104 through power managing commands 144. In some cases, device patterns 142 may be determined collectively across multiple sensing devices 102 within a system 100. In some cases, device patterns 142 may reflect spatial or temporal correlations among multiple sensing devices 102 distributed throughout a structure 108. For example, and without limitation, in an office floor plan where several sensing devices 102 are installed in adjacent rooms, processor 120 may analyze aggregated sensor measurements 126 and signal strength data (device state information 128) across the sensing devices 102. If processor 120 identifies that temperature and $CO_2$ levels across all sensing devices 102 are highly uniform and change synchronously over time (device pattern 142), it may generate a collective device pattern 142 indicating that the monitored phenomena are spatially homogeneous. In some cases, determining device pattern 142 may include determining spatial proximity of neighboring sensing devices 102. Once device pattern 142 is established, processor 120 may use it to generate reference data 138 that represents a localized or system-wide environmental baseline.

With continued reference to FIG. 1, in some cases, generating reference data 138 may include generating a signal map 146 as a function of at least a device pattern 142, wherein the signal map 146 may represent signal strength of at least a sensing device 102 and generating a user interface

118 including the signal map 146. The user interface disclosed herein is further described in detail below. For the purposes of this disclosure, a "signal map" is a data representation that reflects signal strength or connectivity quality associated with one or more sensing devices within a structure. In some cases, processor 120 may generate signal map 146 using signal strength measurements, device state information 128, device pattern 142, and the like. In some cases, signal map 146 may be spatially organized to indicate the relative position of sensing devices 102. In some embodiments, signal map 146 may be visualized in a user interface 118 to aid in evaluating network coverage, signal strength, identifying connectivity dead zones, or optimizing placement of sensing devices 102. In some cases, signal map 146 may serve as part of reference data 138 for diagnosing communication issues, improving data reliability, or informing adaptive control strategies within the environmental monitoring system.

With continued reference to FIG. 1, in some cases, retrieving reference data 138 may include receiving external sensor data 148 of the reference data 138 from one or more external sensors 112 of one or more data sources 140 located remotely from at least a sensing device 102. For the purposes of this disclosure, "external sensor data" is a sensor measurement generated by one or more external sensors. In some cases, external sensor data 148 may include time-stamped numerical values, categorical readings, or metadata transmitted from external sensor 112. As a non-limiting example, external sensor data 148 include ozone concentration levels reported by a municipal air quality monitoring station, ambient temperature values transmitted from a building management system sensor, or wind speed data from a connected weather station. As a non-limiting example, external sensor data 148 include sensor measurements that are obtained from a type of sensor that is not in a sensor cluster 106 or sensing device 102.

With continued reference to FIG. 1, in some cases, determining at least a sensor usage pattern 134 may include identifying a false positive pattern 116 in the at least a measurement pattern 136 as a function of the reference data 138. For the purposes of this disclosure, a "false positive pattern" is a measurement pattern that initially indicates the presence of an environmental event or condition based on sensor data, but which is later determined to be inaccurate, misleading, or not representative of an actual environmental phenomenon. In some cases, false positive pattern 116 may arise due to sensor cross-sensitivity, electrical noise, environmental interference, calibration drift, or transient disturbances that cause a device sensor 110 to produce a signal resembling a true detection. For example, and without limitation, a gas sensor may indicate elevated ozone levels due to the presence of nitrogen dioxide, or an occupancy sensor may register motion caused by airflow rather than a person. In a non-limiting example, when a measurement pattern 136 is detected, such as a sudden spike, sharp increase, or irregular fluctuation in a sensor measurement, processor 120 may retrieve and compare corresponding reference data 138, which may include historical baselines, data from external sensors, or environmental information from public sources. If the measurement pattern 136 deviates from the reference data 138 without corroborating evidence, processor 120 may determine that the signal is inconsistent with actual environmental conditions and classify the anomaly as a false positive pattern 116. In a non-limiting example, processor 120 may identify a false positive pattern 116 in at least a measurement pattern 136 as a function of reference data 138 when sensor measurement 126 indicates a sudden increase in particulate matter levels within a structure 108, but the reference data 138, retrieved from an external weather forecast service, reports stable atmospheric conditions with no indication of dust storms, wildfires, or nearby pollution sources. In this case, the processor 120 may determine that the measurement pattern 136 is inconsistent with the reference data 138 and classify the detected spike as a false positive pattern 116. In some cases, false positive pattern 116 may be stored in a device database 132 and processor 120 may retrieve false positive pattern 116 from the device database 132. In some cases, user may manually input false positive pattern 116.

With continued reference to FIG. 1, in some cases, processor 120 may perform numerical comparisons between sensor measurement 126 and reference data 138. As a non-limiting example, processor 120 may identify a false positive pattern 116 in a measurement pattern 136 by comparing a sudden increase in humidity and particulate matter readings from a sensing device to reference data 138 retrieved from a weather forecasting service. For example, and without limitation, if the reference data 138 indicates clear skies and low humidity levels in the surrounding geographic area, processor 120 may determine that the environmental conditions reported by the sensing device are inconsistent with expected weather patterns. In some cases, processor 120 may perform textual parsing and keyword identification. For instance, and without limitation, processor 120 may scan reference data for keywords such as "wildfire," "dust storm," "pollution warning," or named geographic locations. If no relevant keywords or event indicators are present in the textual data during the time and location corresponding to sensor measurement 126, processor 120 may infer that the detected environmental change lacks external validation and classify it as a false positive pattern 116. In some cases, processor 120 may employ predefined rule sets or machine-learning module 150 trained to correlate measurement pattern 136 with reference data 138 to improve accuracy in identifying false positive patterns 116 over time.

With continued reference to FIG. 1, identifying false positive pattern 116 may include generating a confidence metric 152 as a function of at least a measurement pattern 136 and reference data 138. For the purposes of this disclosure, a "confidence metric" is a value that represents a likelihood that a sensor measurement corresponds to a true environmental condition. For the purposes of this disclosure, a "true environmental condition" refers a physical state or phenomenon present in the monitored environment that objectively exists. In some cases, confidence metric 152 may include a percentage, probability, score, or discrete label that corresponds to the degree of confidence of measurement pattern 136. For example, and without limitation, confidence metric 152 may include a scalar value of 0.95 indicating high confidence that a gas concentration reading reflects a true environmental condition. For example, and without limitation, confidence metric 152 may include a label such as "low," "medium," or "high" confidence associated with a particulate measurement pattern 136. For example, and without limitation, confidence metric 152 may include a score of 70 out of 100 indicating moderate agreement between a sensor measurement 126 and corresponding reference data 138. In some cases, processor 120 may determine confidence metric 152 by comparing a sensor measurement 126 or measurement pattern 136 against reference data 138. For example, and without limitation, if a sensing device 102 detects a sudden increase in ozone concentration, processor 120 may examine whether the increase is supported by similar readings from nearby external sensors or reference data 138 from data sources 140, consistent with recent historical trends (e.g., aggregated device datasets 114 during initialization period, or the like. If these data align with the detected change, the processor 120 may assign a high confidence metric 152 (e.g., close to 1.0 or labeled as "high"). If the measurement appears anomalous relative to the reference data, the processor 120 may assign a lower confidence metric 152 (e.g., close to 0 or labeled as "low"). In some cases, processor 120 may use statistical models, threshold rules, or machine-learning module 150 to determine confidence metric 152 based on reference data 138, and the like.

With continued reference to FIG. 1, in some cases, identifying false positive pattern 116 may include receiving a first sensor measurement from a first device sensor of one or more device sensors 110 configured to detect a first substance, wherein the first device sensor may be cross-sensitive to a second substance, receiving a second sensor measurement from a second device sensor of the one or more device sensors 110 configured to detect the second substance, detecting at least a measurement pattern 136 as a function of the first sensor measurement and identifying the false positive pattern 116 in the at least a measurement pattern 136 based on the detection of the second substance in the second sensor measurement. For the purposes of this disclosure, "cross-sensitivity" refers a characteristic of a sensor in which the sensor exhibits a measurable response not only to its intended target substance or environmental phenomenon, but also to one or more non-target substances or conditions that produce a similar or overlapping signal. Cross-sensitivity may result from chemical similarities between substances, overlapping absorption spectra, shared electrochemical properties, or physical interactions that are not specific to the target input. For the purposes of this disclosure, a substance is a physical material or compound present in the environment that can be detected or measured by a device sensor 110 based on its chemical or physical properties. In some cases, substance may be a gas, vapor, particulate, or aerosol and may be naturally occurring or anthropogenic. Examples of substances may include ozone, nitrogen dioxide, carbon dioxide, carbon monoxide, volatile organic compounds, and particulate matter. For example, and without limitation, an ozone sensor may also respond to nitrogen dioxide due to the similar redox potentials of the two gases, leading to a signal that does not exclusively represent ozone concentration. For example, and without limitation, a volatile organic compound (VOC) sensor may react to a wide range of chemical vapors with varying degrees of specificity. In a non-limiting example, ozone sensor (first device sensor), although specifically designed to detect ozone (first substance), may exhibit a measurable electrical or chemical response when exposed to $NO_2$ (second substance) due to the similar oxidative properties of the two gases. As a result, the ozone sensor may produce an elevated signal that falsely suggests a higher concentration of ozone than is actually present. To address this, a system 100 may also include a dedicated $NO_2$ sensor (second device sensor) that is configured to detect the presence of nitrogen dioxide. If both the ozone sensor and the $NO_2$ sensor report elevated signals at the same time, the processor 120 may infer that the spike observed in the ozone sensor is partially or wholly attributable to the presence of $NO_2$. If the $NO_2$ sensor does not report the presence of $NO_2$ while the ozone sensor reports an elevated signal, the processor 120 may infer that the ozone sensor's signal likely represents a true ozone concentration rather than a cross-sensitive response to $NO_2$. The absence of $NO_2$ measurement from the $NO_2$ sensor reduces the likelihood that the ozone sensor's elevated reading is a false positive caused by cross-sensitivity.

With continued reference to FIG. 1, in some cases, identifying false positive pattern 116 may include determining a second concentration value of a second substance as a function of a second sensor measurement and determining a first concentration value of a first substance as a function of an identification of false positive pattern 116 and the second concentration value and generating a user interface 118 including the first concentration value. The user interface 118 disclosed herein is further described in detail below. For the purposes of this disclosure, a "concentration value" is a quantitative measurement that represents the amount of a particular substance present in a given volume of air. Examples of a concentration value include parts per million (ppm) for gases such as carbon dioxide, parts per billion (ppb) for trace gases like nitrogen dioxide or ozone, and micrograms per cubic meter ($\mu g/m^3$) for particulate matter. In a non-limiting example, identifying a false positive pattern 116 may include determining a second concentration value of nitrogen dioxide as a function of a second sensor measurement from a dedicated $NO_2$ sensor. For instance, and without limitation, the $NO_2$ sensor may report a second concentration value of 60 parts per billion (ppb), indicating the presence of a significant amount of $NO_2$ in the environment. Simultaneously, an ozone sensor, configured to detect ozone but known to exhibit cross-sensitivity to $NO_2$ may report a high sensor signal that would otherwise suggest an ozone concentration value of 100 ppb. Processor 120 may detect a measurement pattern 136 in the ozone sensor signal and based on the concurrent $NO_2$ measurement, identify a false positive pattern 116 in the ozone reading attributable to the presence of $NO_2$. Once the false positive pattern 116 is identified, the processor 120 may apply a predetermined correction model that defines the expected influence of $NO_2$ on the ozone sensor's response. For example, and without limitation, if historical calibration data or reference data 138 indicates that 60 ppb of $NO_2$ contributes approximately 40% of the ozone sensor's signal due to cross-sensitivity, the processor 120 may calculate a corrected first concentration value of ozone as 60 ppb (i.e., 100 ppb reported minus 40 ppb attributed to $NO_2$ interference). This corrected value may then be output as the first concentration value of the first substance (ozone), reflecting a more accurate representation of the true environmental condition.

With continued reference to FIG. 1, determining at least a sensor usage pattern 134 includes determining at least a sensor usage pattern 134 as a function of at least a measurement pattern 136 and false positive pattern 116. In some cases, if processor 120 determines that measurement pattern 136 corresponds to a false positive pattern 116, then the processor 120 may disregard that measurement pattern 136 when determining sensor usage pattern 134 and may reduce its sampling frequency (power managing command 144). In contrast, if the measurement pattern 136 is not identified as a false positive, the processor 120 may treat it as a true environmental event and respond by increasing the sensor's measurement frequency (power managing command 144).

With continued reference to FIG. 1, processor 120 is configured to generate a power managing command 144 as a function of at least a sensor usage pattern 134. For the purposes of this disclosure, a "power managing command" is an instruction configured to modify at least a sensing parameter of at least one device sensor. For the purposes of this disclosure, a "sensing parameter" is a control variable associated with the behavior of a device sensor. In some cases, sensing parameter 104 may influence how device sensor 110 performs environmental monitoring or data acquisition tasks. As a non-limiting example, sensing parameter 104 may include sampling frequency. As another non-limiting example, sensing parameter 104 may include measurement duration, activation interval, sensor duty cycle, threshold sensitivity, detection resolution, warm-up time, or timing of synchronization with other sensors. In some cases, initial frequencies of device sensors 110 may be pre-configured upon installation. In some cases, processor 120 may modify one or more sensing parameters 104 through a power managing command 144 in response to sensor usage pattern 134, or remaining battery life (e.g., device state information 128, remaining operational life 154, and the like) of a sensing device 102. In a non-limiting example, power managing command 144 may reduce energy consumption by decreasing the sampling frequency of device sensors 110 that monitor stable or low-variability phenomena. In another non-limiting example, power managing command 144 may temporarily increase sampling activity in response to a detected environmental event, anomaly, reference data 138, or measurement pattern 136 that exceeds a predefined threshold. In some cases, power managing command 144 may be configured to synchronize battery replacement schedule of sensing device 102. For example, and without limitation, power managing command 144 may be configured to decrease the use of a device sensor 110 that uses more energy and activate other device sensors 110 to supplement the data while ensuring data accuracy. In some cases, power managing command 144 may be configured to prioritize whichever factor (sensor functionality or battery life) has the shortest remaining lifespan (remaining operational life 154) to prolong the lifespan. In some cases, power managing command 144 may be stored in a device database 132 and processor 120 may retrieve power managing command 144 from the device database 132. In some cases, user may manually input power managing command 144.

With continued reference to FIG. 1, in a non-limiting example, when a structure 108 includes a single sensing device 102, sensor usage pattern 134 may be determined among various device sensors 110 housed within that sensing device 102, based on the variability or uniformity of the environmental phenomena each device sensor 110 measures. For example, if certain device sensors 110 consistently detect uniform conditions, such as stable temperature or humidity levels, over time, their sampling frequency may be reduced to conserve power, while other device sensors 110 that measure more dynamic or variable conditions, such as occupancy or volatile compounds, may continue to operate at a higher sampling frequency to maintain responsiveness and data accuracy.

With continued reference to FIG. 1, in a non-limiting example, when a structure 108 includes multiple sensing devices 102, where each may include a device sensor 110 configured to detect the same environmental phenomenon (e.g., temperature, $CO_2$, particulate matter, or the like), processor 120 may determine a sensor usage pattern 134 by evaluating the uniformity of sensor measurements across the sensing devices 102 over time. When the sensor measurements for the specific phenomenon remain consistent or vary within an acceptable threshold across the different sensing devices 102, processor 120 may classify the phenomenon as stable (e.g., sensor usage pattern 134). In response, processor 120 may generate power managing commands 144 to reduce the sampling frequency of individual device sensors 110, thereby minimizing power consumption. For example, and without limitation, processor 120 may reduce the sampling frequency of all sensing devices 102 monitoring the stable phenomenon, resulting in uniform power savings throughout structure 108. For example, and without limitation, processor 120 may selectively reduce the sampling frequency only for those sensing devices 102 with a shortest remaining operational life 154, thereby balancing measurement continuity while extending the service duration of more power-constrained sensing devices 102. For example, and without limitation, instead of every sensing device 102 measuring the same phenomenon once per minute, each sensing device 102 may be configured to measure once every few minutes in a staggered manner, such that at least one sensing device 102 reports a measurement every minute. This distributed sampling approach maintains continuous system-level observation of the phenomenon while reducing redundant measurements and conserving energy across the network of sensing devices 102.

With continued reference to FIG. 1, in a non-limiting example, if reference data 138 indicates that there has been a spike (e.g., measurement pattern 136) in a sensor measurement 126, then processor 120 may generate power managing command 144 to increase a sampling frequency of a sensing device 102.

With continued reference to FIG. 1, in a non-limiting example, processor 120 may be configured to generate power managing command 144 as a function of reference data 138. For example, and without limitation, a sensor measurement 126 or sensor usage pattern 134 obtained from one sensing device 102 located in a first room may be used by a processor 120 to generate a power managing command 144 that controls a sensing parameter 104 of another sensing device 102 located in a different room. For example, and without limitation, if a sensing device 102 in a first room detects a particulate matter, processor 120 may generate a power managing command 144 that instructs another sensing device 102 in a different room to increase a sampling frequency of a device sensor 110 that detects the particulate matter.

With continued reference to FIG. 1, in some cases, generating power managing command 144 may include determining at least a sensor usage pattern 134 as a function of device state information 128 of one or more device datasets 114 and generating the power managing command 144 as a function of the at least a sensor usage pattern 134. For instance, and without limitation, if a sensor usage pattern 134 represents that certain device sensors 110 are operating at a high sampling frequency while monitoring stable environmental conditions, processor 120 may interpret this as an opportunity to reduce energy consumption without compromising data quality. Accordingly, the power managing command 144 may instruct the relevant sensing device 102 to lower the sampling frequency or duty cycle of device sensors 110. For instance, and without limitation, if the sensor usage pattern 134 suggests underutilization of device sensors 110 in zones where data is needed, the processor 120 may increase their activity.

With continued reference to FIG. 1, in some cases, generating power managing command 144 may include determining a remaining operational life 154 of each of at least a sensing device 102 as a function of at least a sensor usage pattern 134 and device state information 128 of one or more device datasets 114 and generating the power managing command 144 for each of the at least a sensing device 102 as a function of the remaining operational life 154 of each of the at least a sensing device 102, wherein the power managing command is configured to decrease a usage of a sensing device with a shortest remaining operation life and proportionally increase a usage of other sensing devices with a longer remaining operation life. For the purposes of this disclosure, "remaining operational life" refers a duration or usage capacity that a sensing device or a device sensor can continue functioning under current or projected operating conditions before requiring maintenance, battery replacement, recalibration, or deactivation. In some cases, remaining operational life 154 may be expressed in units such as hours, days, number of measurement cycles, or percentage of total expected lifetime. In some cases, remaining operational life 154 may account for factors including battery level, power consumption rate, sensor degradation, cumulative sampling activity, or environmental stress conditions of sensing device 102 or device sensor 110. For example, and without limitation, a sensing device 102 powered by a non-rechargeable battery may have a remaining operational life 154 of 15 days based on its current sampling frequency and power usage. For example, and without limitation, a device sensor 110 may have a remaining operational life 154 of 500 cycles before recalibration is needed. In a non-limiting example, device state information 128 may include various indicators that describe an operational status of a sensing device 102 and its internal components. For example, and without limitation, device state information 128 may include a rate at which each device sensor 110 consumes power from a power source of a sensing device 102. In some cases, the consumption rate may depend on a type of device sensor 110, its sampling frequency, duty cycle, measurement duration or warm-up time. For example, and without limitation, a particulate matter sensor may draw significantly more power per measurement cycle than a temperature sensor, and device sensors 110 operating more frequently or at higher resolution may consume more energy over time. In conjunction with sensor usage pattern 134, which reflects how actively and consistently each device sensor 110 is being used, processor 120 may analyze device state information 128 to estimate power depletion trajectory of a sensing device 102. The processor 120 may compute a predicted timeframe or cycle count (remaining operational life 154) until the sensing device 102 reaches a critical energy threshold, becomes non-operational, or reaches a state to replace or charge batteries. In a non-limiting example, processor 120 may then generate a power managing command 144 that strategically reallocates sensing responsibilities across a system 100. Specifically, the power managing command 144 may instruct a sensing device 102 with the shortest remaining operational life to reduce its measurement frequency, duty cycle, or sensor activation, thereby conserving power. At the same time, the processor 120 may instruct other sensing devices 102 with longer remaining operational life to proportionally increase their usage, ensuring that the overall data coverage and monitoring quality are maintained across a structure 108. This coordinated adjustment of sensing parameters 104 allows a system 100 to extend the service life of the network as a whole while minimizing the frequency and complexity of maintenance or device replacement.

With continued reference to FIG. 1, in some embodiments, generating power managing command 144 may include retrieving reference data 138 from one or more data sources 140 using a web crawler, and generating the power managing command 144 as a function of the reference data 138 and device state information 128 of one or more device datasets 114. In some embodiments, reference data 138 may be obtained from data sources 140, such as government environmental agencies, outdoor monitoring stations, wildfire alert systems, or weather and air quality services using a web crawler. For example, and without limitation, reference data 138 may include information about potential or ongoing environmental events such as regional wildfires, elevated PM2.5 levels, ozone advisories, or abnormal weather patterns. In some cases, reference data 138 may then be compared or correlated with sensor measurements 126 and device state information 128, wherein the device state information 128 may include a quantity of sensing devices 102 installed within or for a structure 108. Based on this, processor 120 may generate a power managing command 144. For example, and without limitation, when a building contains hundred individual sensing devices 102, processor 120 may determine that there is a heightened risk of elevated particulate matter concentrations in the building's geographic area. In response, processor 120 may issue power managing commands 144 that increase the sampling frequency of PM sensors across the network of sensing devices 102.

With continued reference to FIG. 1, in some embodiments, system 100 may include a machine-learning module 150 operatively connected to processor 120. In some embodiments, machine-learning module 150 may be configured to enhance the accuracy, efficiency, and adaptability of environmental monitoring and power management operations. In some embodiments, machine-learning module 150 may be implemented locally within processor 120 or externally on a server or cloud-based computing resource. In some embodiments, machine-learning module 150 may be trained using historical sensor data, device state information, and labeled reference data 138 to identify patterns and predict outcomes relevant to the system's operation. For example, and without limitation, machine-learning module 150 may be trained to recognize measurement patterns 136 that precede known environmental events, such as pollution spikes or ventilation changes, or to classify sensor usage pattern 134 that indicate redundancy or inefficiency across sensing devices 102. For example, and without limitation, machine-learning module 150 may improve identification of false positive patterns 116 by learning subtle correlations between sensor outputs and external sensor data 148, including weather conditions, wildfire alerts, or urban activity patterns. For example, and without limitation, machine-learning module 150 may generate predictive inferences or assign confidence metrics 152 to incoming sensor measurements based on learned representations using classification, clustering, or regression models. For example, and without limitation, machine-learning module 150 may be used to optimize the generation of power managing commands 144 by continuously updating models of sensor energy consumption, remaining operational life 154, and network-level redundancy. Over time, machine-learning module 150 may improve its predictions about which device sensors 110 to sample, when to adjust sampling frequency, and how to distribute measurement responsibilities among sensing devices 102 to maximize system efficiency.

With continued reference to FIG. 1, processor 120 is configured to execute power managing command 144 in at least a sensing device 102. In a non-limiting example, power managing command 144 may be transmitted from processor 120 to one or more sensing devices 102 over a wired or wireless communication interface and may be executed locally by the sensing device 102 to adjust its internal sensor operation schedules accordingly.

With continued reference to FIG. 1, in some embodiments, transmitting power managing command 144 may include generating an alert 156 as a function of an identification of false positive pattern 116 and generating a user interface 118 including the alert 156. For the purposes of this disclosure, a "user interface" is a means by which a user and a computer system interact. For example through the use of input devices and software. In some cases, user interface 118 may include device datasets 114, sensor measurement 126, sensor usage pattern 134, measurement pattern 136, reference data 138, false positive pattern 116, power managing command 144, device pattern 142, signal map 146, confidence metric 152, external sensor data 148, concentration value, remaining operational life 154, alert 156, and the like. In some cases, user interface 118 may be integrated to a sensing device 102. In some cases, users may manually change default settings (e.g., sensing parameter 104) of sensing device 102. A user interface 118 may include a graphical user interface (GUI), command line interface (CLI), menu-driven user interface, touch user interface, voice user interface (VUI), form-based user interface, any combination thereof and the like. In some embodiments, user interface 118 may operate on and/or be communicatively connected to a decentralized platform, metaverse, and/or a decentralized exchange platform associated with the user. In some embodiments, a user may interact with the user interface 118 using a computing device distinct from and communicatively connected to at least a processor 120. For example, a smart phone, smart, tablet, or laptop operated by a user. In an embodiment, user interface 118 may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, for the purposes of this disclosure, an "alert" is an indication to inform a user. In some embodiments, processor 120 may transmit alert 156 to user device 130. In some embodiments, alert 156 may include audio, text, image, vibration, and the like. In some embodiments, alert 156 may include a text message, notification sound, phone call, notification banner, or the like. In a non-limiting example, processor 120 may generate and transmit alert 156 to user device 130 to inform any information related to device datasets 114, sensor measurement 126, sensor usage pattern 134, measurement pattern 136, reference data 138, false positive pattern 116, power managing command 144, device pattern 142, signal map 146, confidence metric 152, external sensor data 148, concentration value, remaining operational life 154, alert 156, and the like. Examples of an alert 156 may include a digital message generated when a measured concentration value of nitrogen dioxide exceeds a safety threshold, a system warning indicating a communication failure with a sensing device 102, or a maintenance prompt triggered when the remaining operational life 154 of a device sensor drops below a specified limit. Alerts 156 may be stored, displayed, or transmitted through various system interfaces for review, logging, or further action.

Figure 2A:
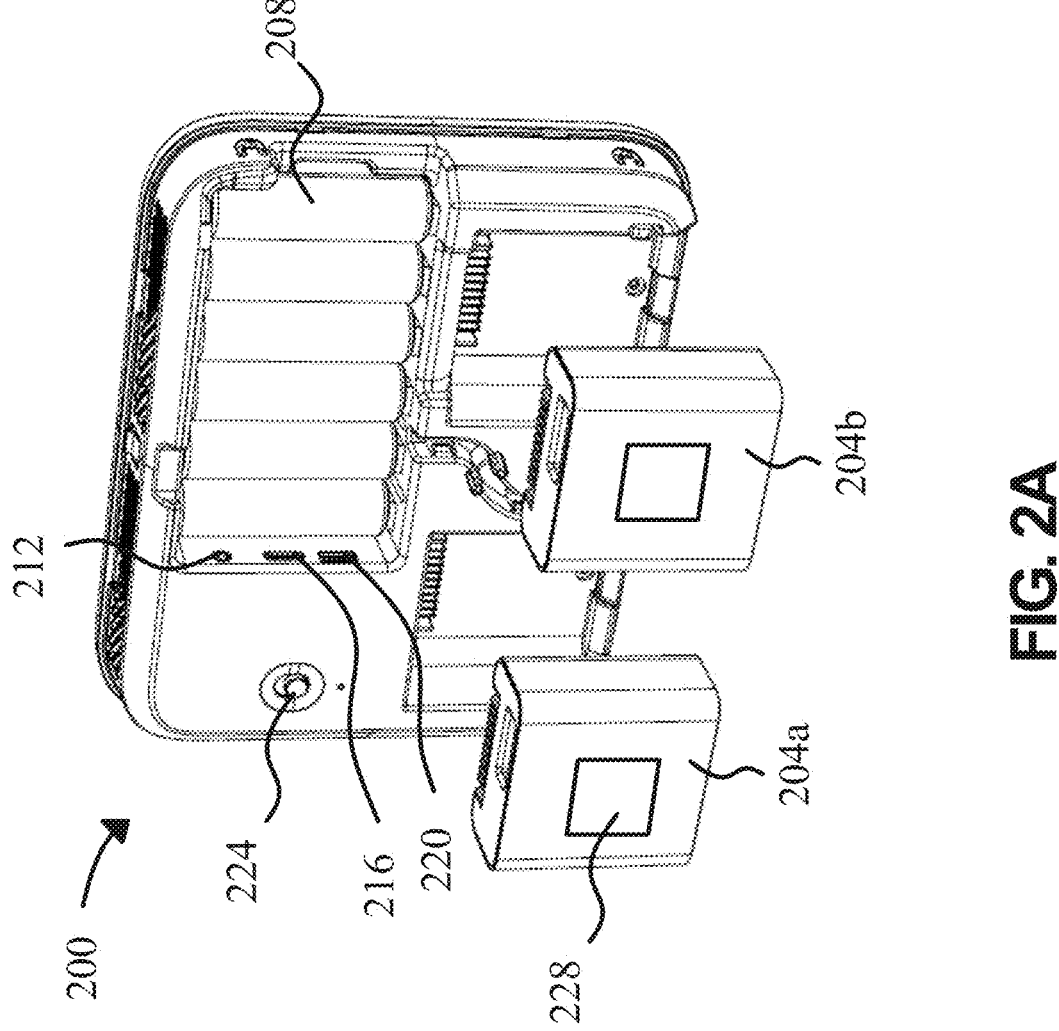
FIG. 2A illustrates an exemplary sensing device with two sensing clusters.

Referring now to FIG. 2A, an exemplary sensing device 200 with two sensing clusters 204*a-b* is illustrated. Sensing device 200 may include a power module 208, antenna 212, power port 216, USB port 220, power switch 224, and the like. Sensing clusters 204*a-b* may include a unique identifier 228. In some cases, unique identifier 228 may include a QR code.

With continued reference to FIG. 2A, power module 208 may house one or more batteries or other forms of energy storage configured to supply electrical power to the various components of sensing device 200. Power module 208 may be rechargeable or non-rechargeable and may be replaceable or integrated, depending on the specific embodiment.

With continued reference to FIG. 2A, an antenna 212 may be provided to enable wireless communication between sensing device 200 and other components of a system, such as a controller, a cloud server, external data sources, or other sensing devices. Antenna 212 may support various communication protocols, including Wi-Fi, Bluetooth, or cellular data, and may be positioned internally or externally.

With continued reference to FIG. 2A, a power port 216 and a USB port 220 may support alternative methods of powering or configuring sensing device 200. Power port 216 may allow for connection to a wired external power supply. USB port 220 may facilitate firmware updates, manual configuration, connection to external data sources or devices, or sensor module diagnostics. A power switch 224 may be included to enable manual activation or deactivation of the sensing device 200.

With continued reference to FIG. 2A, sensing device 200 includes two sensor clusters 204*a* and 204*b*, which may be removably attached to a housing of the sensing device 200. Each sensor cluster 204*a* and 204*b* may include one or more device sensors configured to detect specific environmental phenomena, such as temperature, humidity, ozone, or particulate matter. Sensor clusters 204*a* and 204*b* may be inserted into designated compartments or receptacles on sensing device 200. Sensor clusters 204*a* and 204*b* may be electrically and communicatively coupled to the internal circuitry of the sensing device 200 through docking connectors or similar interfaces.

With continued reference to FIG. 2A, each of sensor clusters 204*a* and 204*b* may include a unique identifier 228. In some cases, unique identifier 228 may take the form of a QR code or similar machine-readable symbol. Unique identifier 228 may encode information such as the sensor cluster's serial number, sensor types, manufacturing batch, calibration history, device state information, or other traceable metadata. In some embodiments, scanning the QR code during installation or maintenance may allow a user or controller to retrieve calibration data, verify compatibility, or register a sensor cluster with a system.

Figure 2B:
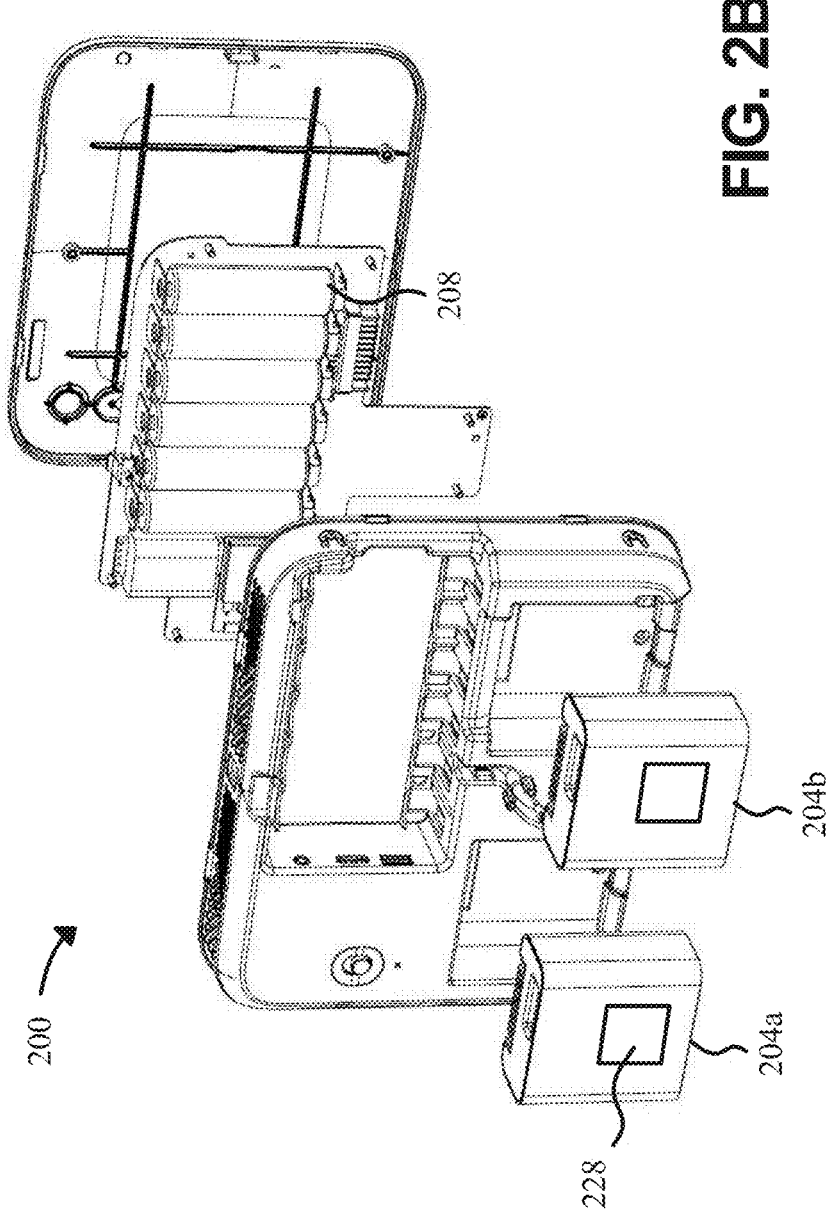
FIG. 2B illustrates an exploded view of an exemplary sensing device with two sensing clusters.

Referring now to FIG. 2B, an exploded view of an exemplary sensing device 200 with two sensing clusters 204*a-b* is illustrated.

Figure 2C:
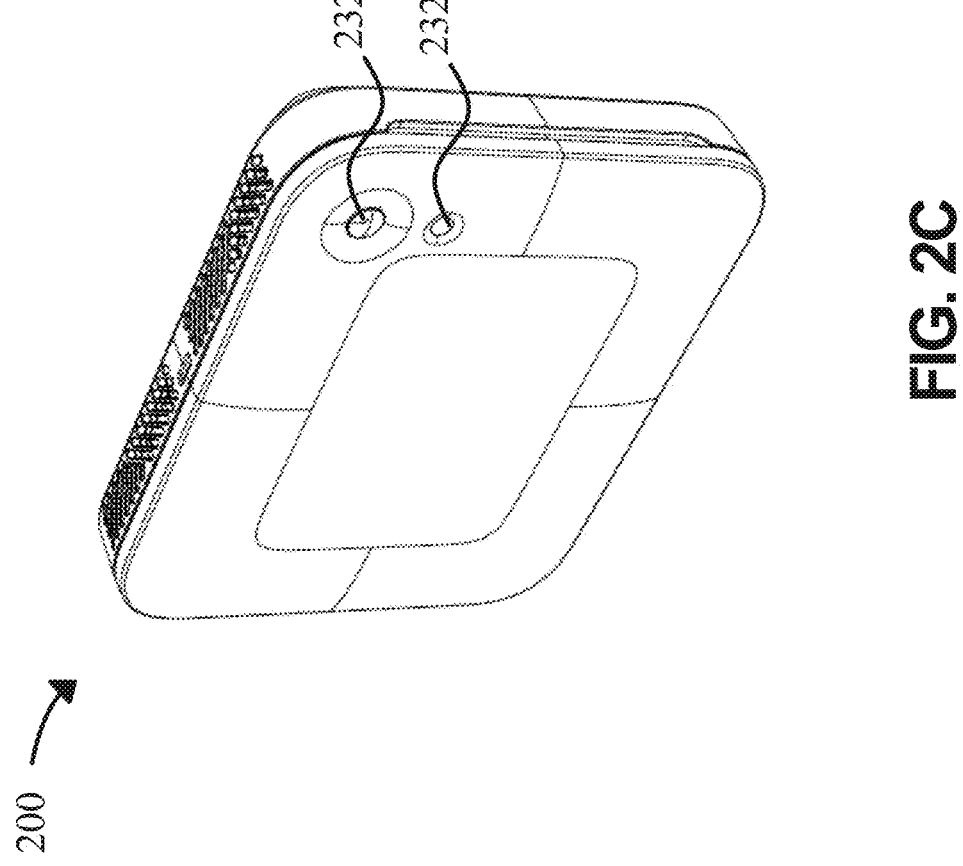
FIG. 2C illustrates a front perspective view of an exemplary sensing device.

Referring now to FIG. 2C, a front perspective view of an exemplary sensing device 200 is illustrated. In some cases, sensing device 200 may include device sensors 232*a-b*. As a non-limiting example, device sensor 232*a* may include an occupancy sensor. Occupancy sensor may be configured to detect the presence or absence of individuals within a monitored area. The occupancy sensor may utilize passive infrared (PIR), ultrasonic, or other motion-detection technologies to register movement or thermal signatures associated with human activity. As another non-limiting example, device sensor 232*b* may include a light sensor. Light sensor may be configured to detect ambient light levels in the environment. The light sensor may employ photodiodes or similar components to measure light intensity.

Figure 2D:
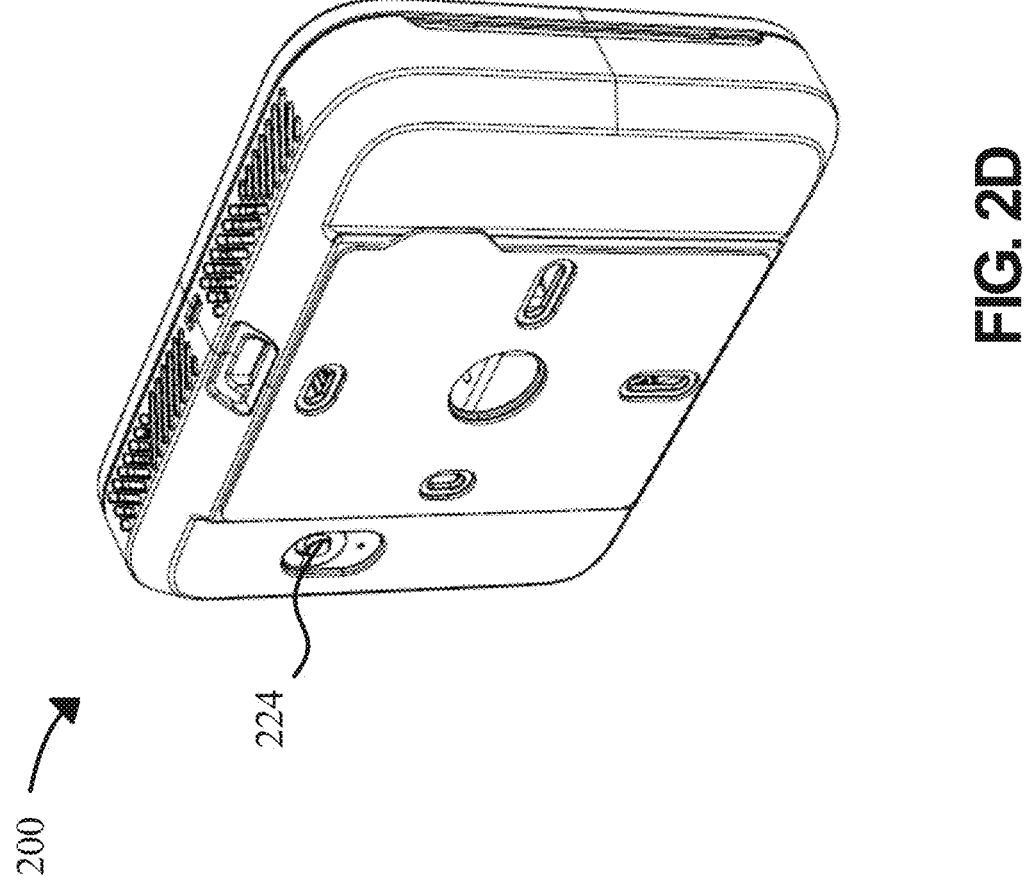
FIG. 2D illustrates a rear perspective view of an exemplary sensing device.

Referring now to FIG. 2D, a rear perspective view of an exemplary sensing device 200 is illustrated.

Figure 3A:
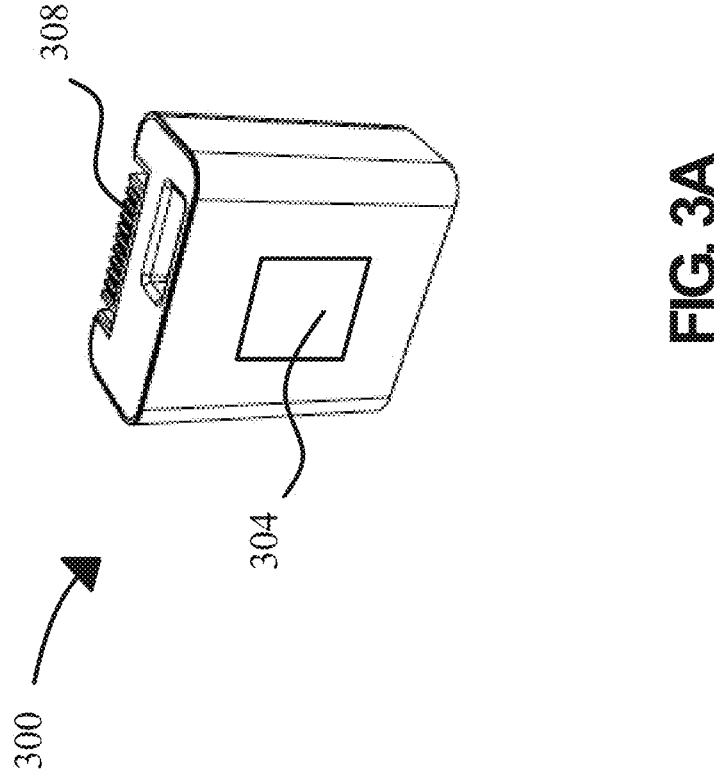
FIG. 3A illustrates a perspective view of an exemplary sensor cluster.

Referring now to FIG. 3A, a perspective view of an exemplary sensor cluster 300 is illustrated. Sensor cluster 300 may be a modular unit configured to be inserted into or removed from a sensing device. Sensor cluster 300 may house one or more device sensors configured to detect environmental phenomena including, but not limited to, temperature, humidity, particulate matter, carbon dioxide, ozone, or volatile organic compounds.

With continued reference to FIG. 3A, in some cases, sensor cluster 300 may include a unique identifier 304 affixed to or integrated on its exterior surface. The unique identifier 304 may take the form of a QR code, barcode, or other machine-readable graphic or alphanumeric encoding, which may store metadata about the sensor cluster 300. This metadata may include a serial number, manufacturing batch, sensor type, calibration date, firmware version, or other traceable information. The unique identifier 304 may be scanned or read by the sensing device or a technician during installation, calibration, or maintenance operations.

With continued reference to FIG. 3A, in some cases, sensor cluster 300 may include an interface connector 308, which is configured to establish electrical and data communication with a sensing device when the sensor cluster 300 is installed. The interface connector 308 may include one or more contact pins, pads, or a multi-pin terminal block, and may support power delivery, sensor signal transmission, and device identification. The interface connector 308 may allow the sensor cluster 300 to exchange data with a controller of the sensing device.

Figure 3B:
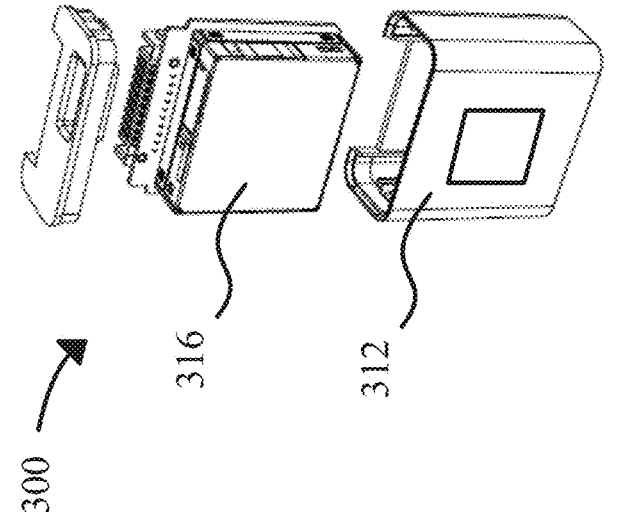
FIG. 3B illustrates an exploded view of an exemplary sensor cluster.

Referring now to FIG. 3B, an exploded view of an exemplary sensor cluster 300 is illustrated. In some cases, sensor cluster 300 may a housing 312. In some cases, sensor cluster 300 may a 316. Housing 312 may form an external shell of the cluster. Housing 312 may be configured to enclose and protect the internal sensor components. Housing 312 may be constructed from a durable material such as injection-molded plastic or a composite material that offers structural stability and environmental protection while allowing airflow for accurate sensing. Housing 312 may include external features such as a unique identifier (e.g., QR code) and ventilation ports aligned with the sensing elements. In some cases, sensor cluster 300 may include one or more device sensors 316, which is disposed within housing 312.

Figure 4A:
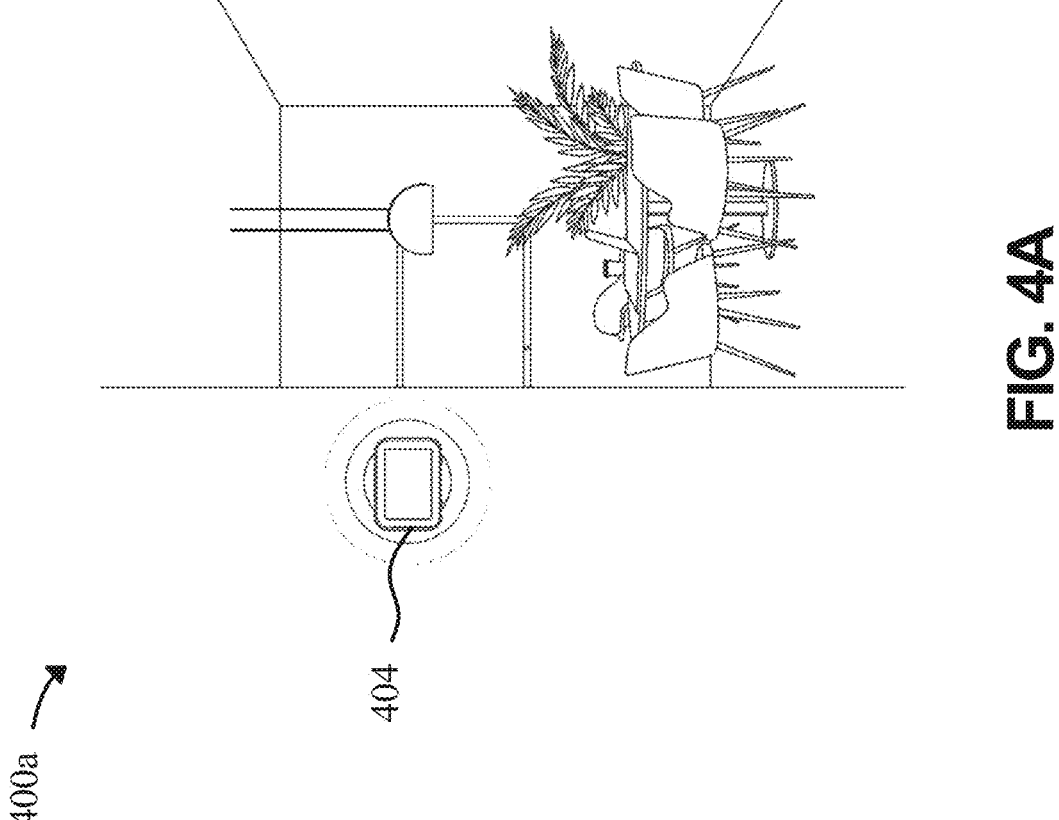
FIG. 4A illustrates an exemplary structure with one sensing device.

Referring now to FIG. 4A, an exemplary structure 400*a* with one sensing device 404 is illustrated. Structure 400*a* may represent an enclosed or partially enclosed built environment such as a room, apartment, office space, classroom, commercial interior, or any other type of indoor space in which environmental monitoring is desired. In some embodiments, structure 400*a* may include a single sensing device 404 mounted on an interior wall. Sensing device 404 may be configured to monitor one or more environmental conditions associated with the structure 400*a*.

Figure 4B:
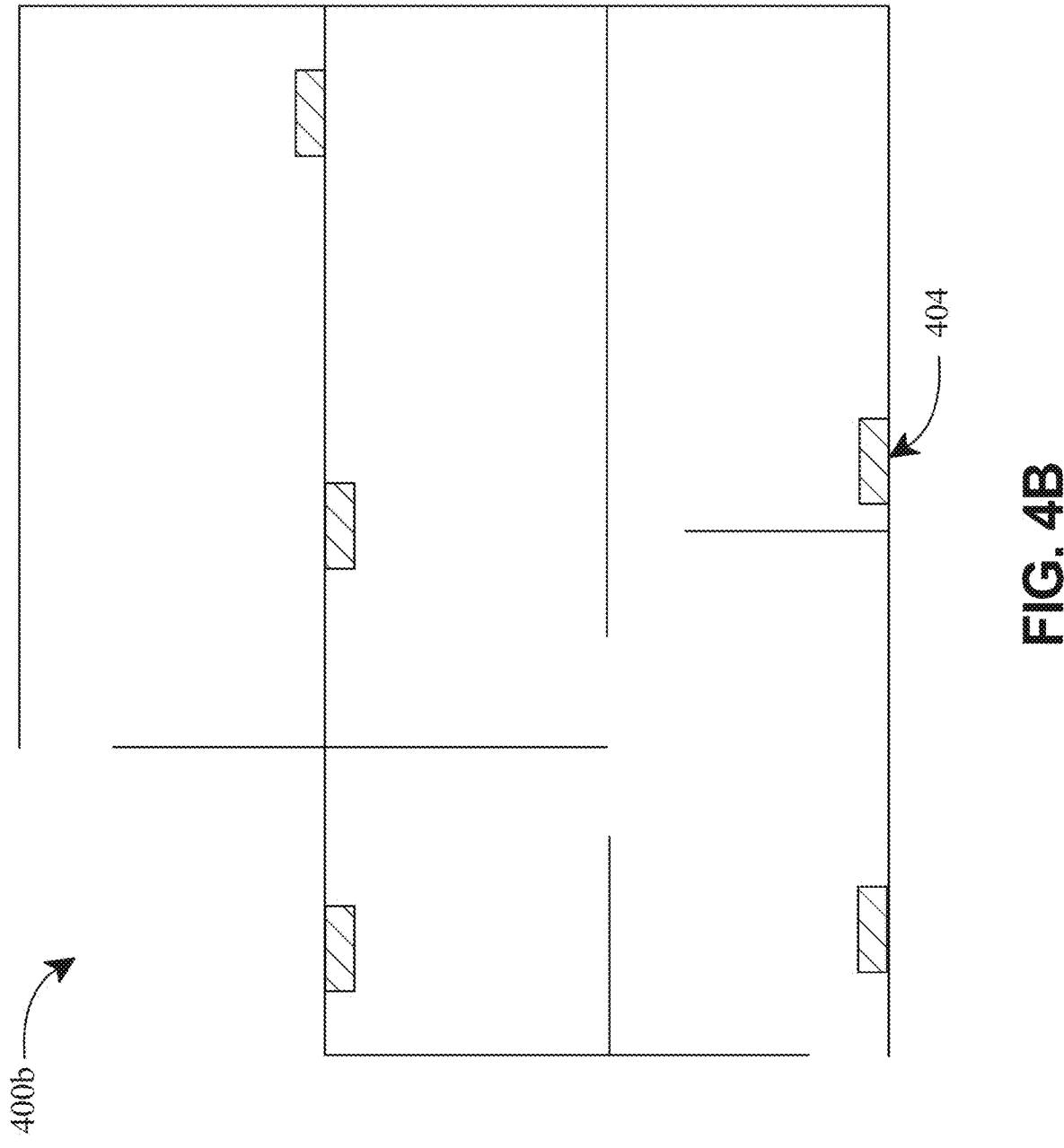
FIG. 4B illustrates another exemplary structure with a plurality of sensing devices.

Referring now to FIG. 4B, an exemplary structure 400*b* with a plurality of sensing devices 404 is illustrated. Structure 400*b* may represent a multi-room, multi-zone, or larger-scale indoor environment. In some cases, structure 400*b* may include a plurality of sensing devices 404. Each sensing device 404 may be spatially arranged to monitor an environmental condition within a particular region, room, or section of the structure 400*b*.

Figure 5A:
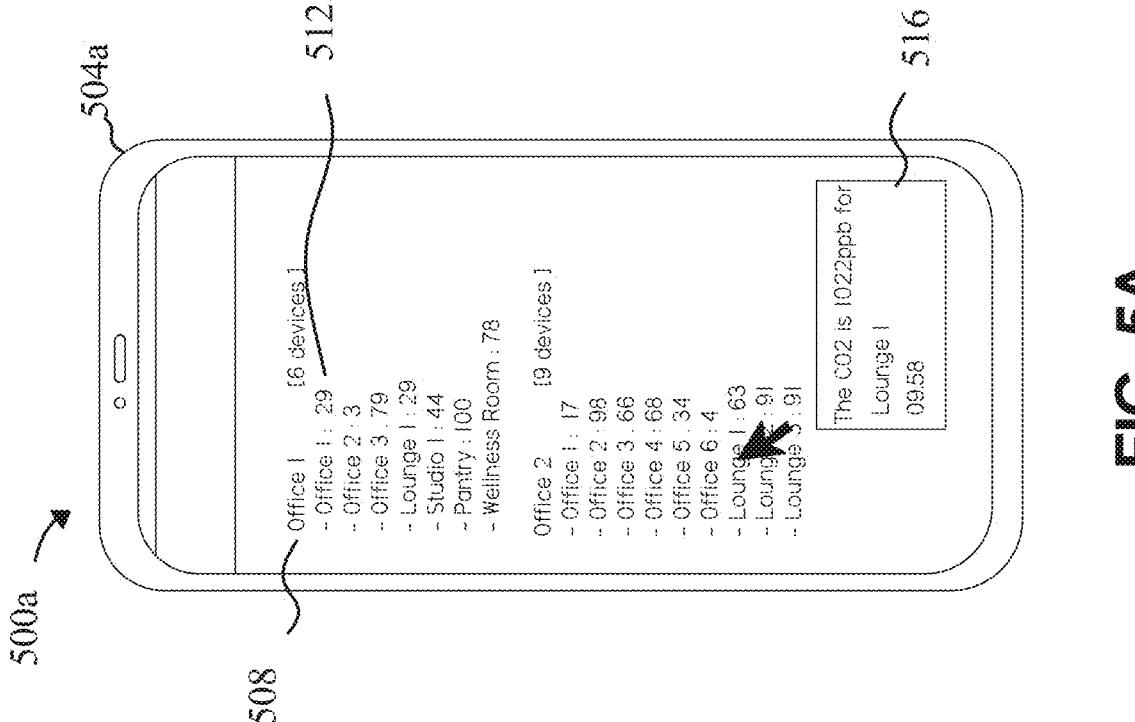
FIG. 5A illustrates an exemplary user interface on a user device.

Referring now to FIG. 5A, an exemplary user interface 500*a* displayed on a user device 504*a* is illustrated. User device 504*a* may include, but is not limited to, a mobile phone, tablet, or other portable computing device. In some cases, user interface 500*a* may include information related to structure 508. In some cases, user interface 500*a* may include sensor measurement 512 for each of a plurality of structures. In some cases, user interface 500*a* may include sensor measurement 512 corresponding to one or more environmental parameters such as temperature, carbon dioxide concentration, particulate matter level, or volatile organic compound presence. In some cases, a user may interact with user interface 500*a* to retrieve detailed information through a pop-up window 516. The pop-up window 516 may be activated through touch or cursor interaction. The pop-up window 516 may include contextual readings such as the exact $CO_2$ concentration, timestamped data, sensor status, or historical values. For example, and without limitation, as illustrated in FIG. 5A, the pop-up window 516 may provide a localized reading indicating that "The $CO_2$ is 1023 ppm for Lounge 1" along with a timestamp.

Figure 5B:
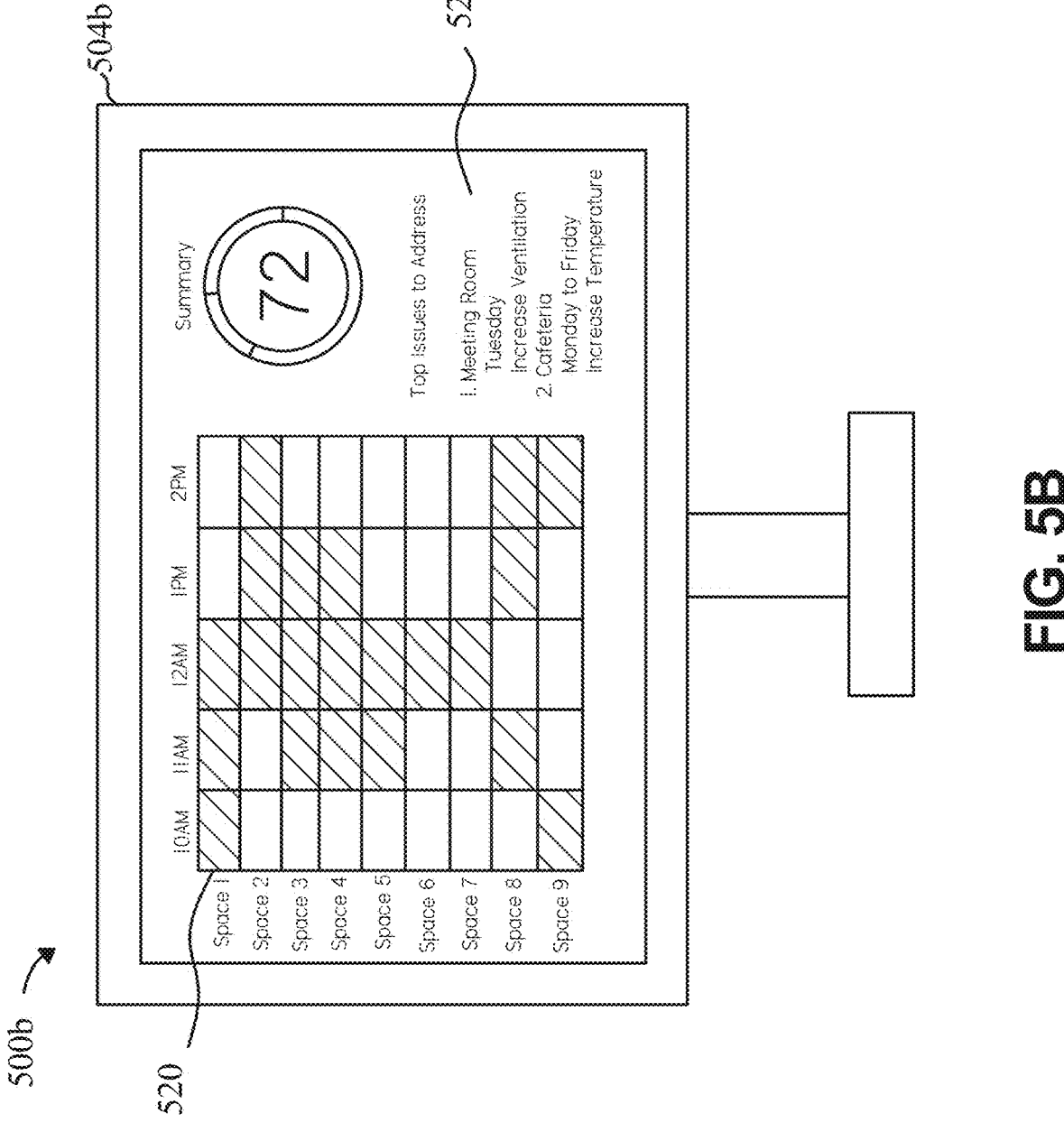
FIG. 5B illustrates another exemplary user interface on a user device.

Referring now to FIG. 5B, an exemplary user interface 500*b* displayed on a user device 504*b* is illustrated. User device 504*b* may include, but is not limited to, a desktop computer, wall-mounted display, tablet, or any other suitable interface platform. In some cases, user interface 500*b* may include a signal map 520. Signal map 520 may provide a temporal and spatial representation of environmental conditions across multiple designated areas or zones within a structure. The signal map 520 may be color-coded, shaded, or patterned to indicate the presence or intensity of particular environmental events, measurements, or anomalies. User interface 500*b* may include a graphical summary indicator. Graphical summary indication may present a numerical environmental performance score or condition index (e.g., "72") that reflects aggregated or weighted metrics across a structure. This metric may be calculated based on sensor usage patterns, confidence metrics, or historical baselines to assist facility managers or system users in evaluating current indoor environmental quality. User interface 500*b* may include alert 524. Alert 524 may present actionable recommendations or highlight areas requiring attention.

Figure 5C:
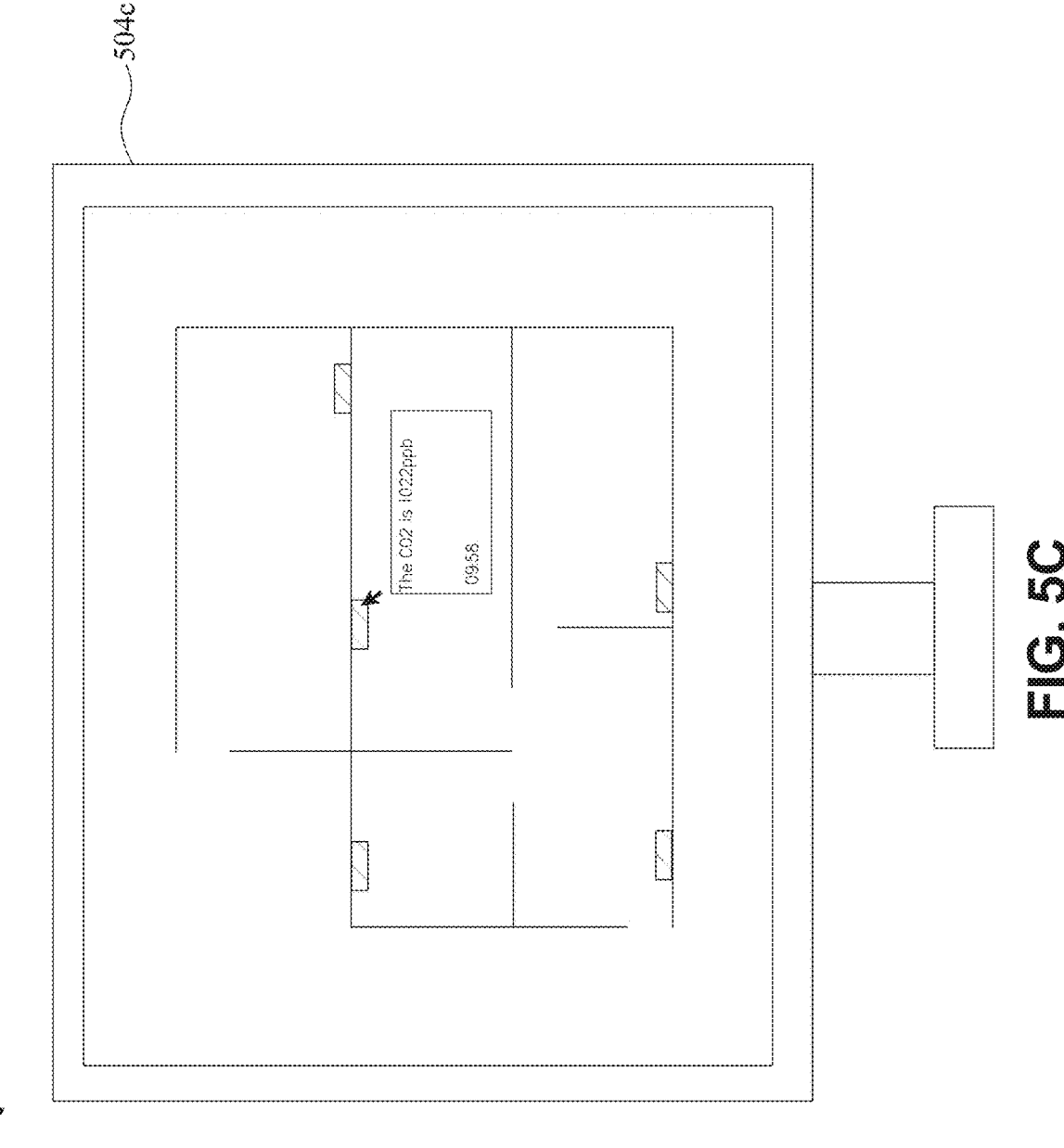
FIG. 5C illustrates another exemplary user interface on a user device.

Referring now to FIG. 5C, an exemplary user interface 500*c* displayed on a user device 504*c* is illustrated.

Figure 6:
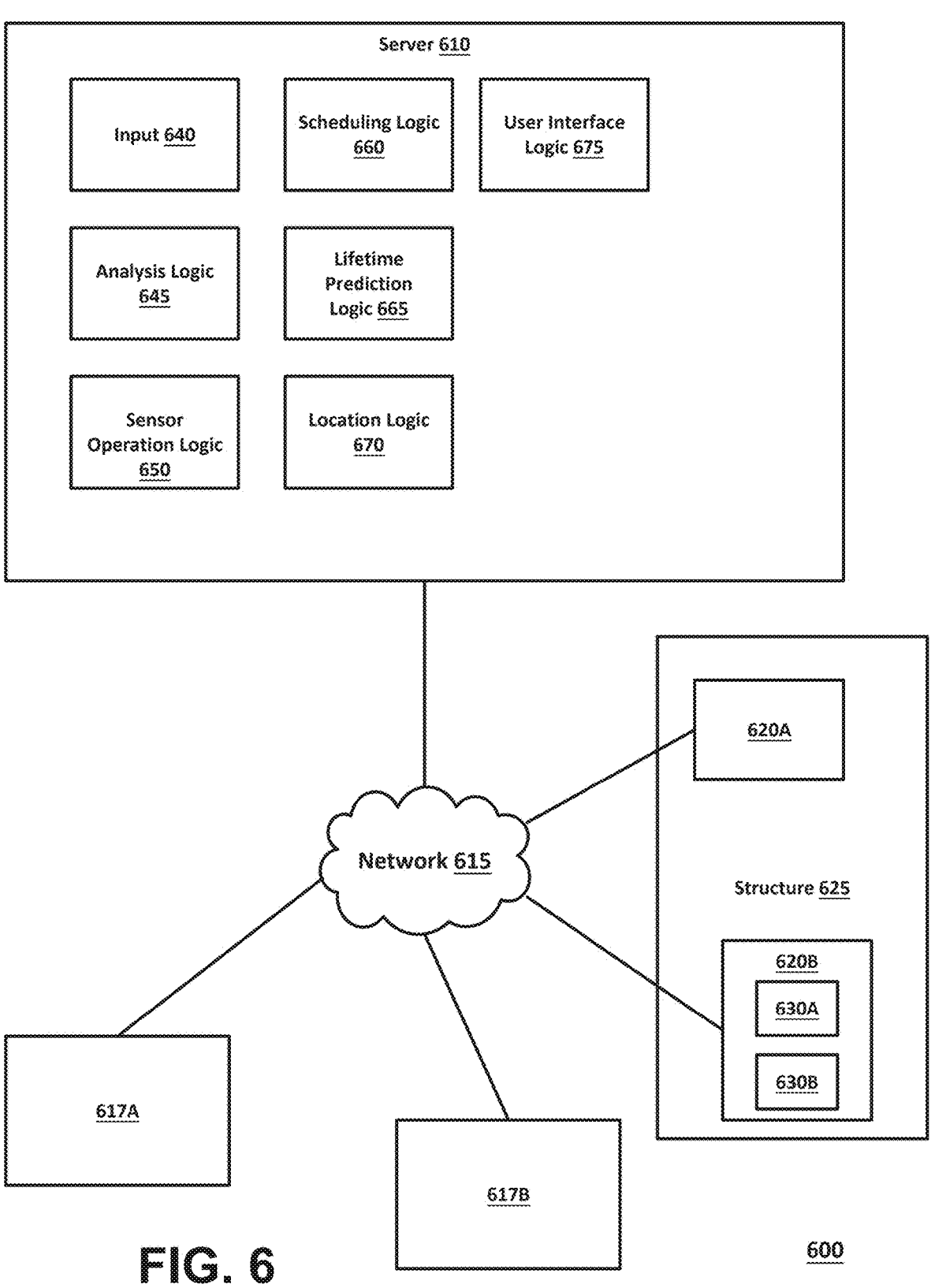
FIG. 6 illustrates a block diagram of an environmental monitoring system, according to various embodiments.

Referring now to FIG. 6, a block diagram of an environmental monitoring system 600, according to various embodiments is illustrated. Environmental monitoring system 600 may include a server 610. Server 610 may include one or more computing devices, optionally connected by a computing network 615 such as the internet. Server 610 may be configured to be accessed via remote user clients 617A-B (individually designated 617A, 617B, etc.).

With continued reference to FIG. 6, server 610 may include an input 640 configured to receive environmental data from a plurality of sensor clusters 620A-B (individually designated 620A, 620B, etc.) within a structure 625. Structure 625 may include a vehicle, building, or section thereof. For example, structure 625 may be an orbital satellite, an aircraft, a ship, an underground mine, an office building or a factory. Structures are not necessarily limited to being indoors. For example, structure 625 may include a parking lot, a city park, a stadium, a railroad, a roadway, and the like.

server 610 may be configured to support a plurality of geographically distributed Structures 625.

With continued reference to FIG. 6, each of sensor clusters 620A-B can include one, two, three or more individual sensors 630A-B (individually designated 630A, 630B, etc.). Sensors 630A-B may be built into a sensor cluster 620A-B and/or may be part of a replaceable module. The sensors 630A-B can include a wide variety of alternative devices. For example sensors 630A-B may be configured to measure: $CO_2$, indoor particulate matter, outdoor particulate matter, Temperature, Relative Humidity, TVOC, Occupancy (PIR), light levels, light levels at red, green, blue, infrared and violet wavelengths, sound pressure levels and a variety of sound frequencies, radio frequencies and intensities, $CO_2$, CO, $NO_x$, $O_3$, $O2_2$, $SO_2$, HCHO, methane, ethylene, biological pathogens, pollen, vibration, differential pressure, occupancy via radar, people counting via optical sensor, $CH_4$, $H_2S$, $NH_3$, $PM_{2.5}$, $PM_{10}$, particle counts at 0.3 um, VOCs (volatile organic compounds), Benzene, Toluene, Xylene, and/or any other condition discussed herein. Sensor cluster 620A-B can include any combination of these sensors 630A-B.

With continued reference to FIG. 6, each of sensor clusters 620A-B can include one, two, three, four or more of sensors 630A-B. The sensors 630A-B in a sensor cluster 620A-B may be discrete components that are attached to a body of the respective sensor cluster 620A-B. Optionally, sensors within a sensor cluster 620A-B optionally share some functionality and/or resources. For example, sensors 630A-B within a sensor cluster 620A-B may share a clock, control logic, wireless communication circuit and/or a power source.

With continued reference to FIG. 6, each of the sensors 630A-B and/or any combination of these sensors 630A-B can be combined into a single physical module, which can be inserted into a sensor cluster 620A-B and easily replaced. These modules may be hot swappable and allow the user to easily replace sensors 630A-B over time in order to maintain calibration and accuracy, upgrade to new parameters, or replace components that may be faulty. These sensor modules may or may not include their own microcontroller and control logic to process sensor data before delivering to sensor cluster 620A-B.

With continued reference to FIG. 6, sensors 630A-B can be built in and/or removable. For example, a first instance of sensor 630A configured to measure $CO_2$ may be built into sensor cluster 620B, while a sensor 630B configured to measure particulate matter may be included in sensor cluster 620B via a removable and replaceable module. Any combination of sensors may be built into the device and/or may be disposed within the removable modules.

With continued reference to FIG. 6, each sensor within a module or sensor cluster 620A-B may be configured to make a different environmental measurement and to generate a different type of environmental data.

With continued reference to FIG. 6, examples of environmental data that may be generated using sensors 630A-B include $CO_2$ (or CO) concentration in ppm (parts per million), Time-weighted average $CO_2$ concentration, Minimum, maximum, and average $CO_2$ concentration over a specified period, Rate of change in $CO_2$ concentration, $CO_2$ flux (rate of $CO_2$ exchange in a given area), Raw signal data from NDIR (Non-Dispersive Infrared) sensor, PM1, PM2.5, PM10 concentrations in $\mu g/m^3$, Particulate matter counts in bins (0.3 um, 0.5 um, 6 um, 2.5 um, 5 um, 60 um, and other sizes), Mass concentration of different PM sizes (PM1, PM2.5, PM10, (or any range therebetween (and/or other sizes), Particle size distribution over time, Raw light scattering signal, PM1, PM2.5, PM10 concentrations in $\mu g/m^3$, Particulate matter counts in bins (0.3 um, 0.5 um, 6 um, 2.5 um, 5 um, 60 um, and other sizes), Wind speed and direction impact on PM distribution, Ambient temperature in ° C. or ° F., Maximum, minimum, and average temperature over a specified period, Rate of change in temperature, Raw thermistor or thermocouple voltage output, Relative humidity percentage (% RH), Dew point temperature, Absolute humidity ($g/m^3$), Raw signal data from capacitive or resistive humidity sensor, TVOC concentration in ppb (parts per billion) or $mg/m^3$, Individual VOC concentrations (if sensor provides speciation), Cumulative TVOC exposure over time, Raw signal data from photoionization detector (PID) or metal-oxide sensor, Occupancy status (occupied/unoccupied), Number of occupancy events, Duration of occupancy events, Raw infrared signal data, Illuminance in lux, Light intensity in different wavelength bands (e.g., UV, visible, IR), Daily light integral (total amount of light received over a day), Raw signal data from photodiode, Light intensity at specific wavelengths (in lux or $W/m^2$), Spectral power distribution, color temperature, raw spectral data from photodiode or spectrometer, Sound pressure level in dB (decibels), frequency spectrum analysis, peak, average, and minimum sound levels, noise exposure over time, raw signal data from microphone, CO (or $CO_2$) concentration in ppm, time-weighted average CO concentration, maximum, minimum, and average CO levels, raw signal data from electrochemical sensor, NO and $NO_2$ concentrations in ppb or ppm, total $NO_x$ concentration, time-weighted average $NO_x$ concentration, Raw signal data from electrochemical sensor, $O_3$ concentration in ppb or ppm, Maximum, minimum, and average $O_3$ levels, $O_3$ exposure over time, Raw signal data from electrochemical sensor, $O_2$ concentration in % or ppm, $O_2$ depletion or enrichment levels, $O_2$ flux (rate of $O_2$ exchange in a given area), Raw signal data from electrochemical sensor, $SO_2$ concentration in ppb or ppm, Time-weighted average $SO_2$ concentration, Maximum, minimum, and average $SO_2$ levels, Raw signal data from electrochemical sensor, HCHO concentration in ppb or ppm, Time-weighted average HCHO concentration, Maximum, minimum, and average HCHO levels, Raw signal data from electrochemical sensor, Pathogen presence/absence, Pathogen concentration ($CFU/m^3$-Colony Forming Units per cubic meter), Specific pathogen identification (e.g., bacteria, viruses, fungi), Raw signal data from bioaerosol sensor, Pollen concentration ($grains/m^3$), Pollen type identification (e.g., tree, grass, weed), Pollen size distribution, Raw signal data from optical sensor, Acceleration ($m/s^2$ or g), Frequency of vibration, Amplitude of vibration, Vibration spectrum analysis, Raw signal data from accelerometer, Pressure difference (Pa) between two points, Pressure gradient over time, Maximum, minimum, and average differential pressure, Raw signal data from pressure sensor, Occupancy status (occupied/unoccupied), Movement detection, Speed and direction of movement, Raw radar signal data, Number of people present, Entry and exit counts, Occupancy trends over time, Raw image data from optical sensor, $CH_4$ concentration in ppm or % LEL (Lower Explosive Limit), Maximum, minimum, and average $CH_4$ levels, Time-weighted average $CH_4$ concentration, Raw signal data from catalytic bead or infrared sensor, $H_2S$ concentration in ppb or ppm, Time-weighted average $H_2S$ concentration, Maximum, minimum, and average $H_2S$ levels, Raw signal data from electrochemical sensor, $NH_3$ concentration in ppb or ppm, Time-weighted average $NH_3$ concentration, Maximum, minimum, and average $NH_3$ levels, Raw signal data from electrochemical sensor, Mass concentration of PM10, Raw signal data from optical sensor, Particle count at 0.3 $\mu m$ bin, Concentration of particles at 0.3 $\mu m$ in $particles/m^3$, Temporal distribution of 0.3 $\mu m$ particles, Raw signal data from optical sensor, VOC concentration in ppb or $mg/m^3$, Individual VOC species concentration, Cumulative VOC exposure over time, Raw signal data from photoionization detector (PID) or metal-oxide sensor, Benzene concentration in ppb or $mg/m^3$, Time-weighted average Benzene concentration, Maximum, minimum, and average Benzene levels, Raw Benzene signal data from gas chromatograph or PID sensor, Toluene concentration in ppb or $mg/m^3$, Time-weighted average Toluene concentration, Maximum, minimum, and average Toluene levels, Raw Toluene signal data from gas chromatograph or PID sensor, Xylene concentration in ppb or $mg/m^3$, Time-weighted average Xylene concentration, Maximum, minimum, and average Xylene levels, Raw Xylene signal data from gas chromatograph or PID sensor.

With continued reference to FIG. 6, certain sensors 630A-B may be included together in the same sensor cluster 620A-B and be used together in a complementary manner to provide new outputs. For example, a more accurate occupancy signal is output by combining the rate of change of $CO_2$ and temperature readings with a PIR signal. PIR readings provide imperfect occupancy data and can be augmented by these additional sensor readings.

With continued reference to FIG. 6, input 640 may include wireless input, but in alternative embodiments may be wired, configured to communicate via a powerline network, an optical input, and/or the like. In some embodiments input 640 may be configured to receive the environmental data from the sensor clusters via a mesh network including the sensors.

With continued reference to FIG. 6, server 610 may include analysis logic 645. Analysis logic 645 is configured to process the received environmental data to generate an environmental status output. Optionally, analysis logic 645 may be configured to selectively average environmental data received from specific sensors to improve accuracy of the environmental status output, selection of the specific sensors being based on location of the specific sensors within the environment, and/or based on a degree of correlation between the sensors, or the fact that they share common traits. For example, they might not be physically near each other but might share the same mechanical equipment in the building (e.g., be at different locations in the same air duct). So, one on 3rd floor, one on 7th, but both served by same air handling unit.

With continued reference to FIG. 6, server 610 may include sensor operation logic 650. Sensor operation logic 650 may be configured to determine an operation schedule for the sensors, the operation schedule being configured to optimize battery life (or other power source) of a sensor cluster, to optimize lifetime of the sensors, to automatically select sensors to be used in adaptive sampling, to manage a power source of each of the sensor clusters, and/or to optimize a replacement schedule for the sensor clusters. In some embodiments sensor operation logic 650 is configured to increase use of a first of the sensors in response to environmental data received from a second of the sensors. For example, sensor operation logic 650 may be configured to increase use of a sensor of a first type in response to environmental data received from a sensor of a second type. In another example, sensor operation logic 650 is configured to coordinate lifetime of each of the sensor clusters to such that an end of life for each of the sensor clusters occurs within a grouped time period.

With continued reference to FIG. 6, in a specific example, sensor operation logic 650 may be configured to optimize battery life in a sensor cluster that may include 6, 2, 3 or more types of sensors. Such optimization may include scheduling use of the sensors in a particular cluster to control the battery life of that cluster. An optimized battery life may or may not imply the longest possible battery life. For example, in a system including multiple sensor clusters it may be desirable to have the batteries in different clusters all require replacement in a single maintenance event, thus saving maintenance costs. This may mean that the lifetime, e.g., battery life, of a particular cluster is not maximized. As used herein "lifetime" is used to refer to the time between (or time remaining to) maintenance events such as sensor replacement or battery replacement.

With continued reference to FIG. 6, server 610 may include scheduling logic 660. Scheduling logic 660 is configured to generate scheduling data for each of sensors 630A-B, the scheduling data being based on the operation schedule. scheduling logic 660 is responsive to outputs of the analysis logic 645, which may include managing power efficiently. Power management strategies are integrated into the scheduling logic, making it adaptable to data from the same or other sensors 630A-B and sensor clusters 620A-B. For instance, the scheduling logic 660 may increase the interval between readings for battery-powered sensors 630A-B by leveraging data from nearby sensors with similar or related readings. This is useful because, for example, Particulate Matter (PM) sensors consume significantly more power compared to other types of sensors 630A-B. To address this, scheduling logic 660 can be configured to group sensors 630A-B into adaptive sampling groups. Data from multiple sensors 630A-B is optionally averaged to reduce the number of local readings needed, thus conserving battery life.

With continued reference to FIG. 6, a sensor 630A-B or sensor cluster 620A-B may enhance accuracy and reduce variability in sensor readings by intelligently averaging data from nearby sensor clusters. For example, battery-powered PM sensors, which cannot afford frequent internal readings due to power constraints, benefit from this method as it allows fewer readings without sacrificing accuracy. The analysis logic 645 and scheduling logic 660 assess the correlation between sensors, using readings from highly correlated sensors to form a weighted average. This reduces variability and increases accuracy without additional power consumption. Furthermore, the system extends battery life and sensor lifespan by utilizing an interleaved sampling pattern for buildings or floors with multiple sensors. In this pattern, sensors alternate reading times, significantly extending battery life and reducing the frequency of sensor replacements due to sensor drift.

With continued reference to FIG. 6, in many installations, multiple sensor clusters are present within the same structure or even on the same floor. Certain sensor readings tend to be similar in these scenarios, allowing the system to alternate sampling intervals between sensor clusters. For instance, if sensor clusters in a group consistently show highly correlated readings, the system reduces the sampling frequency for individual sensors and implements an alternating pattern where, for example, sensor 6 reads during period 6, sensor 2 reads during period 2, and so on. This approach dramatically increases battery life and extends sensor lifetime by reducing the total number of environmental data readings per year. The algorithm is designed to respond to sudden changes in any single sensor's readings by temporarily increasing its sampling frequency and number of sensor clusters until its readings again correlate with other devices in the group.

With continued reference to FIG. 6, additionally, the system can utilize a small number of "sentry clusters" that always sample at a higher frequency. These sensor clusters, either connected to a power line or requiring more frequent battery changes, help reduce the power consumption of the larger group. This method scales with the number of sensor clusters, providing increasing benefits as more sensor clusters are included in each sampling group.

With continued reference to FIG. 6, in various embodiments, elements of scheduling logic 660 are disposed on individual sensor clusters rather than server 610. The system may include an output configured to send scheduling data to each sensor cluster, ensuring coordinated and efficient operation across the entire network of sensors.

With continued reference to FIG. 6, network 615 can include any type of communication network such as a telephone network, a wireless network, the internet, a local area network, a wide area network, a wired network, and/or the like.

With continued reference to FIG. 6, sensor clusters 620A-B can include any combination of: $CO_2$, indoor particulate matter, outdoor particulate matter, Temperature, Relative Humidity, TVOC, Occupancy (PIR), light levels, light levels at red, green, blue, infrared and violet wavelengths, sound pressure levels and a variety of sound frequencies, CO, $NO_x$, $O_3$, $O2_2$, $SO_2$, HCHO, biological pathogens, pollen, vibration, differential pressure, occupancy via radar, people counting via optical sensor, $CH_4$, $H_2S$, $NH_3$, $PM_{2.5}$, $PM_{10}$, particle counts at 0.3 um (or any other commonly measures size range or bin discussed herein), VOCs, Benzene, Toluene, Xylene, RF levels, and/or any other type of sensor discussed herein.

With continued reference to FIG. 6, server 610 optionally further may include lifetime prediction logic 665 configured to estimate a lifetime of each of sensor clusters 620A-B and/or of each of sensors 630A-B.

With continued reference to FIG. 6, sensor clusters 620A-B may require regular maintenance. This can include the replacement of batteries, the replacement of sensors, the cleaning of sensors, the recalibration of sensors, and other tasks that require manual intervention. There are two main opportunities for optimization of maintenance tasks: minimizing maintenance team travel overhead and minimizing downtime or maintenance team workload due to too many sensor clusters requiring maintenance together. To minimize travel overhead, it is desirable to ensure that devices in physical proximity require maintenance at approximately the same time. For instance, if devices A and B in adjacent rooms 6 and 2 require maintenance on the same day, only one round trip is needed. This can be achieved by monitoring resource consumption (battery life, sensor life) across the fleet and reallocating the operational load to nearby devices that have been using fewer resources.

With continued reference to FIG. 6, it is beneficial to notify the maintenance team in advance so they can schedule the required maintenance before the window expires. These methods are part of a monitoring and control process running on a remote compute server, enhancing efficiency and reducing costs.

With continued reference to FIG. 6, lifetime prediction logic 665 may be configured to estimate times at which maintenance tasks are required for each sensor 630A-B and/or sensor cluster 620A-B and optionally suggest ways in which the maintenance tasks can be clustered into maintenance events. These suggestions may be provided to scheduling logic 660 to produce a sensor use schedule resulting in a more optimal maintenance schedule. Maintenance tasks and events are costly due to the hours required to implement, the potential size of the structures involved, and the potential number of tasks in the maintenance event.

With continued reference to FIG. 6, users strongly prefer infrequent service requirements for sensor clusters, including battery and sensor replacements. Some sensors 630A-B, such as Particulate Matter (PM) sensors have a limited lifespan because they take readings by pulling air through the sensor, evaluating particle content. Over time, particles accumulate on internal surfaces, including the lens and other sensor mechanisms, interfering with accuracy. Thus, PM sensors need replacement after a certain number of readings to maintain accuracy and calibration.

With continued reference to FIG. 6, some sensor clusters 620A-B use batteries that are unable to accurately calculate battery lifetime from voltage, so lifetime prediction logic is used to model the power consumption of hardware and software components, assessing every potential variable's impact on battery life. The server delivers configuration settings to the device (e.g., sampling schedule, which sensors are active). Based on these configurations, the cloud calculates power consumption over time relative to known battery capacities. This can be optionally tuned based on specific battery models provided by the customer.

With continued reference to FIG. 6, in some embodiments, server 610 may include location logic 670 configured 670. Location logic 670 may be configured to generate suggested locations for the plurality of sensors based on an architecture of the structure. Optionally, location logic 670 may be further configured to specify which combination of sensors should be included in each of the sensor clusters.

With continued reference to FIG. 6, in some embodiments, server 610 may include user interface logic 675. User interface logic 675 is configured to present the environmental status output to a user.

Figure 7:
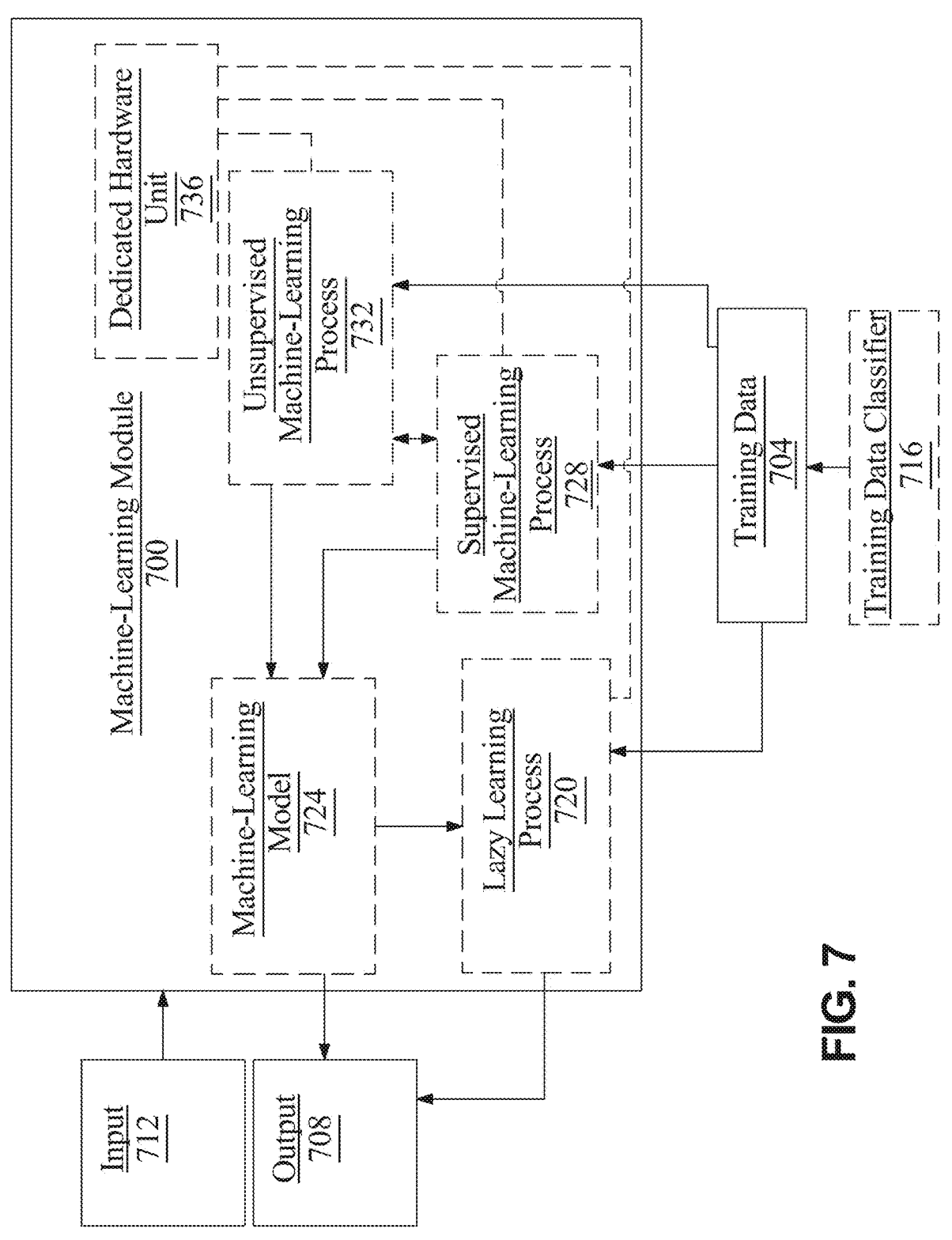
FIG. 7 illustrates a block diagram of an exemplary machine-learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm instantiated in hardware or software logic, data structures, and/or functions that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example, input data and output data may include device datasets, sensor measurement, sensor usage pattern, measurement pattern, reference data, false positive pattern, power managing command, device pattern, signal map, confidence metric, external sensor data, concentration value, remaining operational life, alert, and the like.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 700 may generate a classifier using a classification algorithm, defined as a process whereby a computing device and/or any module and/or component operating thereon derives a classifier from training data 704. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to a structure cohort or user cohort related to a type of industry, location, and the like of a structure and a user.

Still referring to FIG. 7, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 7, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 7, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute $l$ as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 7, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 7, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 7, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 7, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 7, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 7, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 7, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 7, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$: $X_{new}=X-X_{min}/X_{max}-X_{min}$. Feature scaling may include mean normalization, which involves use of a mean value of a set and/or subset of values, $X_{mean}$ with maximum and minimum values: $X_{new}=X-X_{mean}/X_{max}-X_{min}$. Feature scaling may include standardization, where a difference between X and $X_{mean}$ is divided by a standard deviation $\sigma$ of a set or subset of values: $X_{new}=X-X_{mean}/\sigma$. Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as: $X_{new}=X-X_{median}/IQR$. Persons skilled in the art, upon reviewing the entirety of this disclosure, will IQR be aware of various alternative or additional approaches that may be used for feature scaling.

Further referring to FIG. 7, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include device datasets, sensor measurement, sensor usage pattern, measurement pattern, reference data, false positive pattern, power managing command, device pattern, signal map, confidence metric, external sensor data, concentration value, remaining operational life, and the like as described above as inputs sensor usage pattern, measurement pattern, reference data, false positive pattern, power managing command, device pattern, signal map, confidence metric, external sensor data, concentration value, remaining operational life, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

With further reference to FIG. 7, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 7, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 732 may not require a response variable; unsupervised processes 732 may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 7, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 7, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 7, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 7, one or more processes or algorithms described above may be performed by at least a dedicated hardware unit 736. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 736 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 736 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 736 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 8:
FIG. 8 illustrates a diagram of an exemplary neural network.

Referring now to FIG. 8, an exemplary embodiment of neural network 800 is illustrated. A neural network 800 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 804, one or more intermediate layers 808, and an output layer of nodes 812. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further nonlimiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 9:
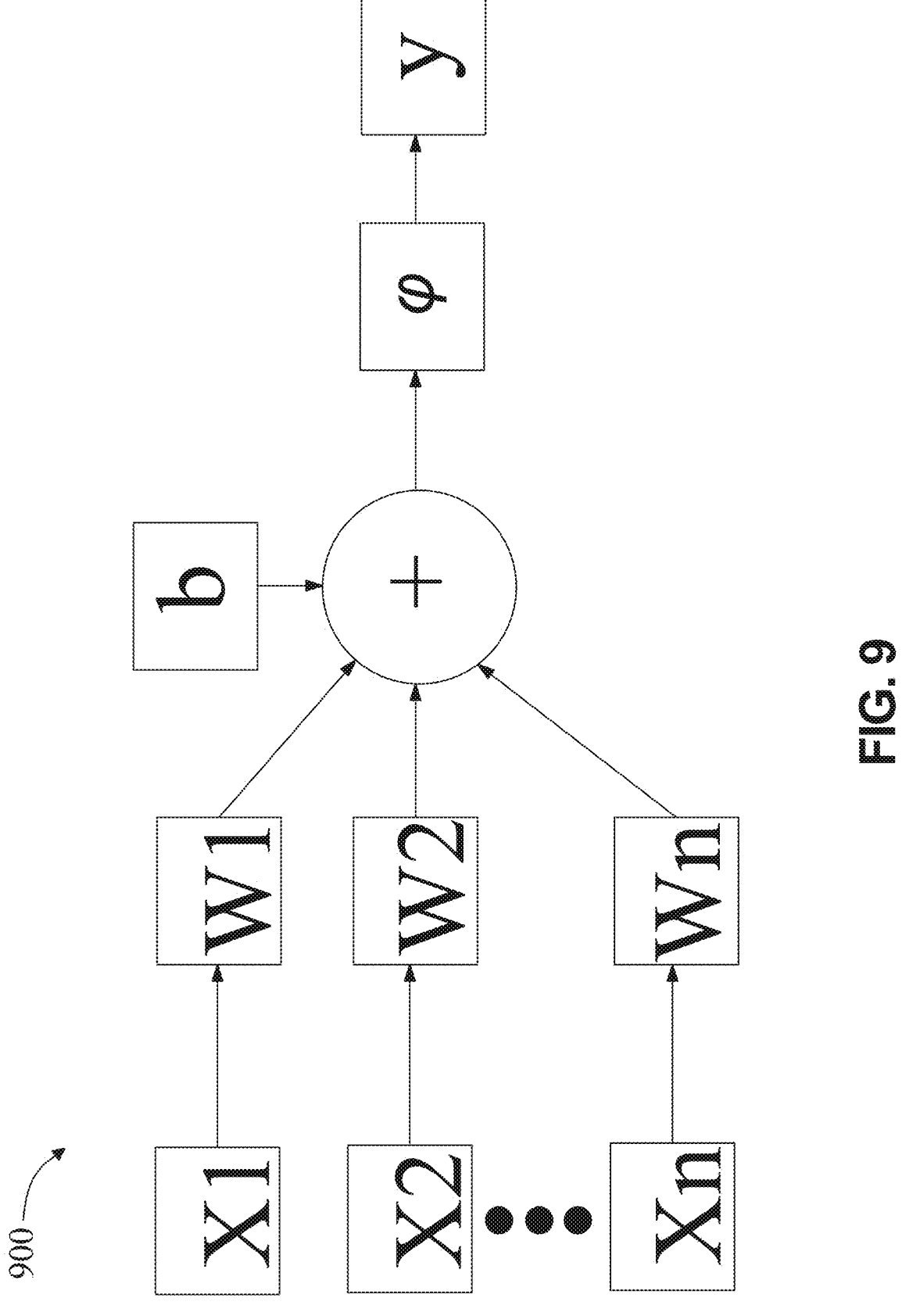
FIG. 9 illustrates a block diagram of an exemplary node in a neural network.

Referring now to FIG. 9, an exemplary embodiment of a node 900 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x*\text{sigmoid}(x)$, a Gaussian error linear unit function such as $f(x) = \alpha(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs x; that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, Wold is the previous weight value, a is a parameter to set the learning rate, and $$\frac{dJ}{dw}$$

is the partial derivative of with respect to weight w.

Figure 10:
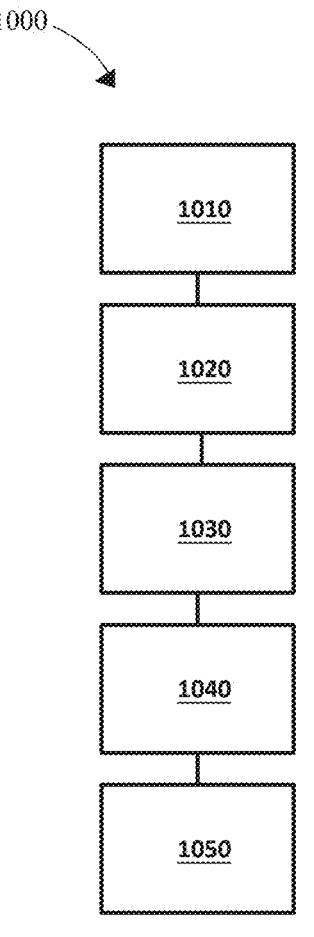
FIG. 10 illustrates methods of environmental monitoring using a plurality of sensor clusters, according to various embodiments.

Referring now to FIG. 10, FIG. 10 illustrates methods 1000 of environmental monitoring using a plurality of sensor clusters, according to various embodiments. These methods 1000 include schedule management. In a Receive Environmental Data Step 1010 environmental data is received from a first sensor of a plurality of sensors. In a Process Step 1020 the environmental data is processed to detect a change in environmental conditions. In a generate operation schedule step 1030 an operation schedule for a second sensor of the plurality of sensors is generated based on the change in environmental conditions. In a schedule data step 1040 scheduling data for the second sensor is generated based on the operation schedule. In an optional send schedule data step 1050 the scheduling data is sent to the second sensor to change a schedule for activation of the second sensor.

With continued reference to FIG. 10, in alternative embodiments, the environmental data is received from an (external) source other than the first sensor. For example, the environmental data may arise from a weather alert, news of a wildfire, an EPA alert, an emergency alert system message, a (news or social media) report of an industrial accident (e.g., train derailment), and/or the like. This data may be processed in Process Step 1020 and then used to generate an operation schedule in Generate Operation Schedule Step 1030, followed by Generate Schedule Data Step 1040, and the like. Thus, the schedule for the second sensor may be changed subject to data received from external sources. In some cases, the sensor clusters or sensors may include any combination of a VOC sensor, a particulate sensor, an infrared sensor, a motion sensor, an indoor radar, a CO2 sensor, a temperature sensor, a light sensor, a current sensor, and/or any other sensor discussed herein. In some cases, the first sensor and the second sensor are part of different sensor clusters, each of the sensor clusters including more than one sensor and a power source shared by the more than one sensor. In some cases, the first sensor and the second sensor are configured to detect different environmental conditions. In some cases, the operation schedule for the second sensor includes an increased use of the second sensor in response to a change in environmental conditions detected by the first sensor. In some cases, the operational schedule is configured to minimize a difference between an expected lifetime of a first sensor cluster including the first sensor and an expected lifetime of a second sensor cluster including the second sensor. In some cases, the second sensor is configured to confirm the change in environmental conditions. In some cases, method 1000 may further include selecting the second sensor based on the second sensor being configured to detect an environmental condition that is complementary to an environmental condition detected by the first sensor. In some cases, method 1000 may further include selecting the second sensor based on a proximity and/or correlation to the first sensor. These may be implemented as reference to FIGS. 1-9.

Figure 11:
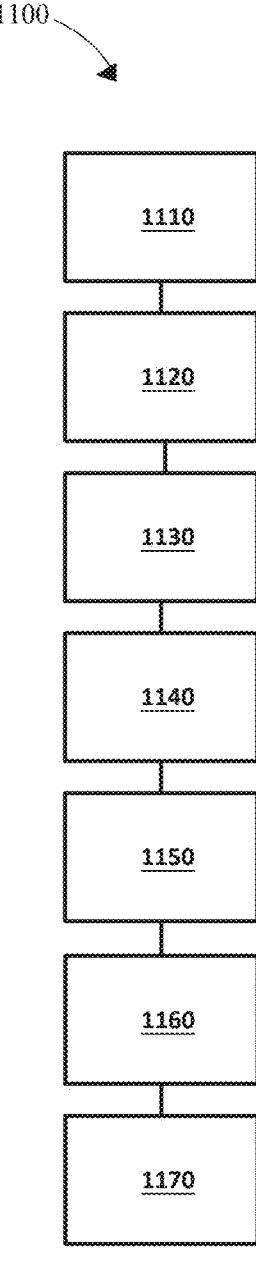
FIG. 11 illustrates methods of environmental monitoring using a plurality of sensor clusters, according to various embodiments.

Referring now to FIG. 11, FIG. 11 illustrates methods 1100 of environmental monitoring using a plurality of sensor clusters, according to various embodiments. These methods 1100 includes lifetime management. In a receive first environmental data step 1110 environmental data is received from a first sensor. In a receive second environmental data step 1120 environmental data is received from a second sensor. The first and second sensors are optionally from different sensor clusters. In an estimate first lifetime step 1130 the remaining life of the first sensor is estimated. In an estimate second lifetime step 1140 the remaining life of the second is estimated. In a generate operation schedule step 1150 an operation schedule for the second sensor is generated based on the remaining lifetime of the first sensor and the remaining lifetime of the second sensor, the operation schedule being configured to reduce a difference between the remaining lifetime of the first sensor and the remaining lifetime of the second sensor. In a generate scheduling data step 1160 scheduling data for the second sensor is generated based on the operation schedule. In a send scheduling data step 1170 the scheduling data is sent to the second sensor to change a schedule for activation of the second sensor. In some cases, the sensor clusters or sensors may include any combination of a VOC sensor, a particulate sensor, an infrared sensor, a motion sensor, an indoor radar, a CO2 sensor, a temperature sensor, a light sensor, a current sensor, and/or any other sensor discussed herein. In some cases, the first sensor and the second sensor are part of different sensor clusters, each of the sensor clusters including more than one sensor and a power source shared by the more than one sensor. In some cases, the first sensor and the second sensor are configured to detect different environmental conditions. In some cases, the operation schedule for the second sensor includes an increased use of the second sensor in response to a change in environmental conditions detected by the first sensor. In some cases, the operational schedule is configured to minimize a difference between an expected lifetime of a first sensor cluster including the first sensor and an expected lifetime of a second sensor cluster including the second sensor. In some cases, the second sensor is configured to confirm the change in environmental conditions. In some cases, method 1100 may further include selecting the second sensor based on the second sensor being configured to detect an environmental condition that is complementary to an environmental condition detected by the first sensor. In some cases, method 1100 may further include selecting the second sensor based on a proximity and/or correlation to the first sensor. These may be implemented as reference to FIGS. 1-10.

Figure 12:
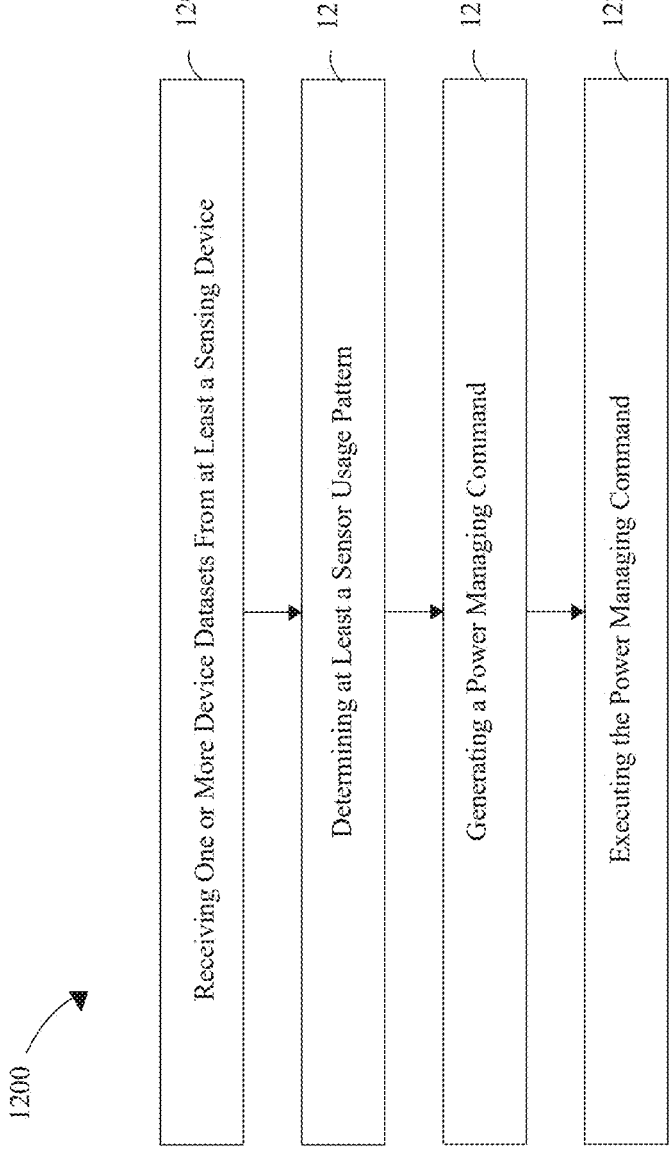
FIG. 12 illustrates a flow diagram of an exemplary method for adaptive environmental monitoring with intelligent sampling and power management.

Referring now to FIG. 12, a flow diagram of an exemplary method 1200 for adaptive environmental monitoring with intelligent sampling and power management is illustrated. Method 1200 contains a step 1205 of receiving, using at least a processor communicatively connected to at least a sensing device, one or more device datasets from the at least a sensing device, wherein the one or more device datasets includes a sensor measurement from each of one or more device sensors of the at least a sensing device, and the at least a sensing device is configured to monitor an environmental condition associated with at least a structure, wherein the at least a sensing device includes at least a sensor cluster including the one or more device sensors, wherein the one or more device sensors is configured to measure one or more environmental phenomena. These may be implemented as reference to FIGS. 1-11.

With continued reference to FIG. 12, method 1200 contains a step 1210 of determining, using at least a processor, at least a sensor usage pattern as a function of one or more device datasets, wherein determining the at least a sensor usage pattern includes detecting at least a measurement pattern as a function of a sensor measurement retrieving reference data from one or more data sources, and determining the at least a sensor usage pattern as a function of the at least a measurement pattern and the reference data. In some embodiments, retrieving the reference data may include aggregating the one or more device datasets for an initialization period from the at least a sensing device, identifying at least a device pattern associated with the at least a sensing device as a function of the plurality of aggregated device datasets and generating the reference data as a function of the at least a device pattern. In some embodiments, generating the reference data may include generating a signal map as a function of the at least a device pattern, wherein the signal map represents signal strength of the at least a sensing device and generating a user interface including the signal map. In some embodiments, retrieving the reference data may include receiving external sensor data of the reference data from one or more external sensors of the one or more data sources located remotely from the at least a sensing device. In some embodiments, determining the at least a sensor usage pattern may include identifying a false positive pattern in the at least a measurement pattern as a function of the reference data, wherein identifying the false positive pattern may include receiving a first sensor measurement from a first device sensor of the one or more device sensors configured to detect a first substance, wherein the first device sensor is cross-sensitive to a second substance, receiving a second sensor measurement from a second device sensor of the one or more device sensors configured to detect the second substance, detecting the at least a measurement pattern as a function of the first sensor measurement and identifying the false positive pattern in the at least a measurement pattern based on the detection of the second substance in the second sensor measurement. In some embodiments, identifying the false positive pattern may include determining a second concentration value of the second substance as a function of the second sensor measurement; and determining a first concentration value of the first substance as a function of the identification of the false positive pattern and the second concentration value; and generating a user interface including the first concentration value. In some embodiments, identifying the false positive pattern may include generating a confidence metric as a function of the at least a measurement pattern and the reference data, wherein the confidence metric represents a likelihood that the sensor measurement corresponds to a true environmental condition. These may be implemented as reference to FIGS. 1-11.

With continued reference to FIG. 12, method 1200 contains a step 1215 of generating, using at least a processor, a power managing command as a function of at least a sensor usage pattern, wherein the power managing command is configured to modify at least a sensing parameter of at least one device sensor of one or more device sensors. In some embodiments, generating the power managing command may include determining a remaining operational life of each of the at least a sensing device as a function of the at least a sensor usage pattern and device state information of the one or more device datasets, and generating the power managing command for each of the at least a sensing device as a function of the remaining operational life of each of the at least a sensing device, wherein the power managing command is configured to decrease a usage of a sensing device with a shortest remaining operation life, and proportionally increase a usage of other sensing devices with a longer remaining operation life. In some embodiments, generating the power managing command may include determining the at least a sensor usage pattern as a function of device state information of the one or more device datasets, and generating the power managing command as a function of the at least a sensor usage pattern. In some embodiments, generating the power managing command may include retrieving the reference data from one or more data sources using a web crawler, and generating the power managing command as a function of the reference data and device state information of the one or more device datasets. These may be implemented as reference to FIGS. 1-11.

With continued reference to FIG. 12, method 1200 contains a step 1220 of executing, using at least a processor, a power managing command in at least a sensing device. These may be implemented as reference to FIGS. 1-11.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
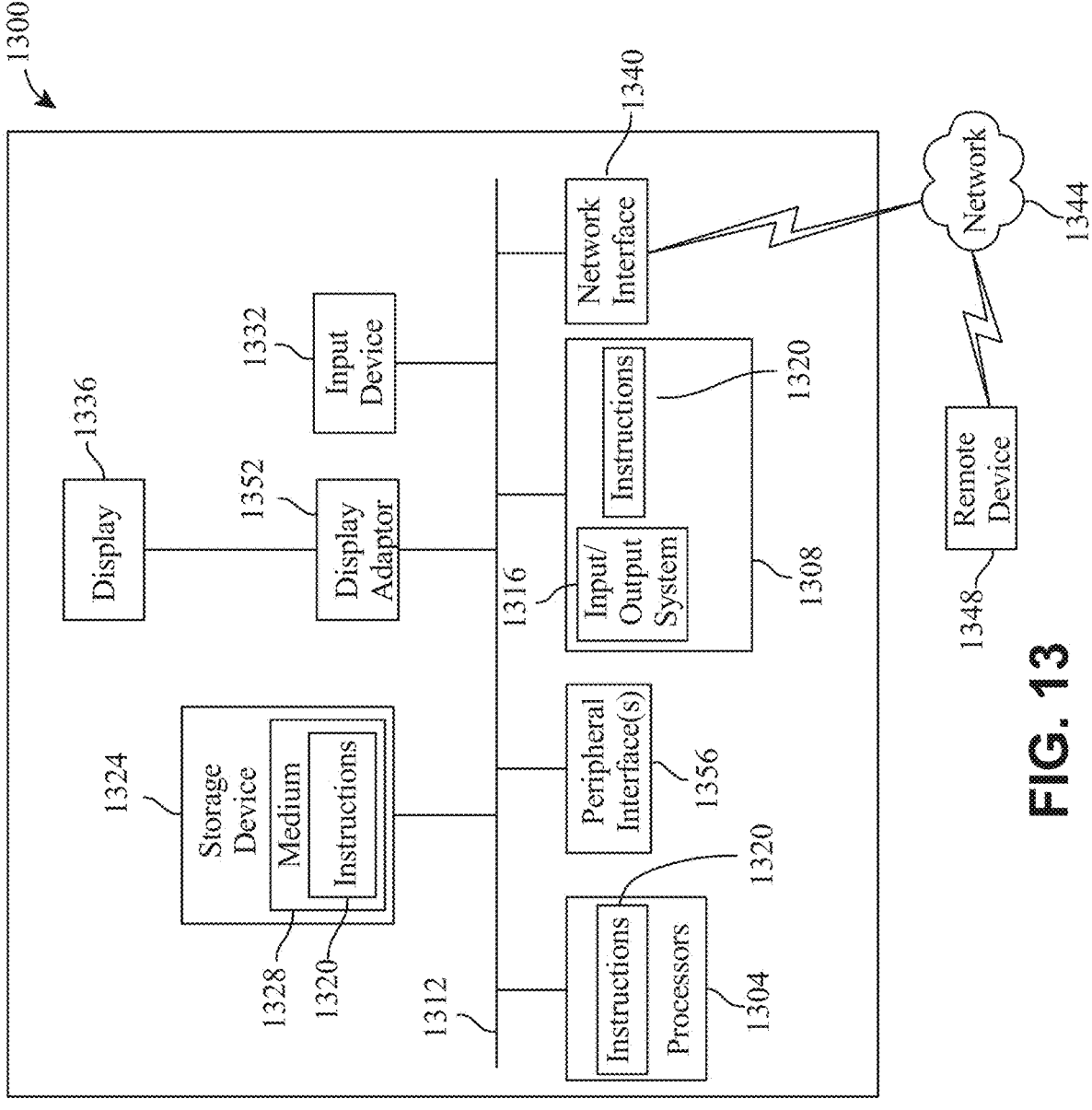
FIG. 13 illustrates a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof. Memory 1308 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In some embodiments, storage device 1324 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIRE-WIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display 1336. Examples of a display device include, but are not limited to, a liquid crystal display (LCD), a cathode ray tube (CRT), a plasma display, a light emitting diode (LED) display, and any combinations thereof. Display adapter 1352 and display 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

Further referring to FIG. 13, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 13, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 13, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 1300, processor 1304, and memory 1308 may be virtualized; that is, a virtual machine and/or container may interact directly with such computing system 1300, processor 1304, and/or memory 1308, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 1304 comprises a plurality of processors and/or processor cores, virtualization may, in some cases, simulate or emulate a single (virtual) processor whose functions are allocated to one or more of the plurality of processors and/or processor cores. In this case, while processor 1304 may be said to be virtualized, the processor 1304, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for adaptive environmental monitoring with intelligent sampling and power management, the system comprising:

at least a sensing device configured to monitor an environmental condition associated with at least a structure, wherein the at least a sensing device comprises:

at least a sensor cluster comprising one or more device sensors, wherein the one or more device sensors are configured to measure one or more environmental phenomena; and at least a processor communicatively connected to the at least a sensing device, wherein the at least a processor is configured to:

receive one or more device datasets from the at least a sensing device, wherein the one or more datasets comprise a sensor measurement from each of the one or more device sensors;

determine at least a sensor usage pattern as a function of the one or more device datasets, wherein determining the at least a sensor usage pattern comprises:

detecting at least a measurement pattern as a function of the sensor measurement;

retrieving reference data from one or more data sources; and determining the at least a sensor usage pattern as a function of the at least a measurement pattern and the reference data;

generate a power managing command as a function of the at least a sensor usage pattern, wherein the power managing command is configured to modify at least a sensing parameter of at least one device sensor of the one or more device sensors, and wherein generating the power managing command further comprises:

determining a remaining operational life of each of the at least a sensing device as a function the at least a sensor usage pattern and device state information of the one or more device datasets; and generating the power managing command for each of the at least a sensing device as a function of the remaining operational life of each of the at least a sensing device, wherein the power managing command is configured to decrease a usage of a sensing device with a shortest remaining operation life and proportionally increase a usage of other sensing devices with a longer remaining operation life; and execute the power managing command in the at least a sensing device.

2. The system of claim 1, wherein retrieving the reference data comprises:

aggregating the one or more device datasets for an initialization period from the at least a sensing device;

identifying at least a device pattern associated with the at least a sensing device as a function of the one or more of aggregated device datasets; and generating the reference data as a function of the at least a device pattern.

3. The system of claim 2, wherein generating the reference data comprises:

generating a signal map as a function of the at least a device pattern, wherein the signal map represents signal strength of the at least a sensing device; and generating a user interface comprising the signal map.

4. The system of claim 1, wherein retrieving the reference data comprises receiving external sensor data of the reference data from one or more external sensors of the one or more data sources located remotely from the at least a sensing device.

5. The system of claim 1, wherein determining the at least a sensor usage pattern comprises identifying a false positive pattern in the at least a measurement pattern as a function of the reference data, wherein identifying the false positive pattern comprises:

receiving a first sensor measurement from a first device sensor of the one or more device sensors configured to detect a first substance, wherein the first device sensor is cross-sensitive to a second substance;

receiving a second sensor measurement from a second device sensor of the one or more device sensors configured to detect the second substance;

detecting the at least a measurement pattern as a function of the first sensor measurement; and identifying the false positive pattern in the at least a measurement pattern based on the detection of the second substance in the second sensor measurement.

6. The system of claim 5, wherein identifying the false positive pattern comprises:

determining a second concentration value of the second substance as a function of the second sensor measurement; and determining a first concentration value of the first substance as a function of the identification of the false positive pattern and the second concentration value; and generating a user interface comprising the first concentration value.

7. The system of claim 5, wherein identifying the false positive pattern comprises generating a confidence metric as a function of the at least a measurement pattern and the reference data, wherein the confidence metric represents a likelihood that the sensor measurement corresponds to a true environmental condition.

8. The system of claim 1, wherein generating the power managing command comprises:

determining the at least a sensor usage pattern as a function of device state information of the one or more device datasets; and generating the power managing command as a function of the at least a sensor usage pattern.

9. The system of claim 1, wherein generating the power managing command comprises:

retrieving the reference data from the one or more data sources using a web crawler; and generating the power managing command as a function of the reference data and device state information of the one or more device datasets.

10. A method for adaptive environmental monitoring with intelligent sampling and power management, the method comprising:

receiving, using at least a processor communicatively connected to at least a sensing device, one or more device datasets from the at least a sensing device, wherein:

the one or more device datasets comprise a sensor measurement from each of one or more device sensors of the at least a sensing device; and the at least a sensing device is configured to monitor an environmental condition associated with at least a structure, wherein the at least a sensing device comprises:

at least a sensor cluster comprising the one or more device sensors, wherein the one or more device sensors are configured to measure one or more environmental phenomena;

determining, using the at least a processor, at least a sensor usage pattern as a function of the one or more device datasets, wherein determining the at least a sensor usage pattern comprises:

detecting at least a measurement pattern as a function of the sensor measurement:

retrieving reference data from one or more data sources; and determining the at least a sensor usage pattern as a function of the at least a measurement pattern and the reference data;

generating, using the at least a processor, a power managing command as a function of the at least a sensor usage pattern, wherein the power managing command is configured to modify at least a sensing parameter of at least one device sensor of the one or more device sensors, and wherein generating the power managing command further comprises:

determining a remaining operational life of each of the at least a sensing device as a function the at least a sensor usage pattern and device state information of the one or more device datasets; and generating the power managing command for each of the at least a sensing device as a function of the remaining operational life of each of the at least a sensing device, wherein the power managing command is configured to decrease a usage of a sensing device with a shortest remaining operation life and proportionally increase a usage of other sensing devices with a longer remaining operation life; and executing, using the at least a processor, the power managing command in the at least a sensing device.

11. The method of claim 10, wherein retrieving the reference data comprises:

aggregating the one or more device datasets for an initialization period from the at least a sensing device;

identifying at least a device pattern associated with the at least a sensing device as a function of the one or more of aggregated device datasets; and generating the reference data as a function of the at least a device pattern.

12. The method of claim 11, wherein generating the reference data comprises:

generating a signal map as a function of the at least a device pattern, wherein the signal map represents signal strength of the at least a sensing device; and generating a user interface comprising the signal map.

13. The method of claim 10, wherein retrieving the reference data comprises receiving external sensor data of the reference data from one or more external sensors of the one or more data sources located remotely from the at least a sensing device.

14. The method of claim 10, wherein determining the at least a sensor usage pattern comprises identifying a false positive pattern in the at least a measurement pattern as a function of the reference data, wherein identifying the false positive pattern comprises:

receiving a first sensor measurement from a first device sensor of the one or more device sensors configured to detect a first substance, wherein the first device sensor is cross-sensitive to a second substance;

receiving a second sensor measurement from a second device sensor of the one or more device sensors configured to detect the second substance;

detecting the at least a measurement pattern as a function of the first sensor measurement; and identifying the false positive pattern in the at least a measurement pattern based on the detection of the second substance in the second sensor measurement.

15. The method of claim 14, wherein identifying the false positive pattern comprises:

determining a second concentration value of the second substance as a function of the second sensor measurement; and determining a first concentration value of the first substance as a function of the identification of the false positive pattern and the second concentration value; and generating a user interface comprising the first concentration value.

16. The method of claim 14, wherein identifying the false positive pattern comprises generating a confidence metric as a function of the at least a measurement pattern and the reference data, wherein the confidence metric represents a likelihood that the sensor measurement corresponds to a true environmental condition.

17. The method of claim 10, wherein generating the power managing command comprises:

determining the at least a sensor usage pattern as a function of device state information of the one or more device datasets; and generating the power managing command as a function of the at least a sensor usage pattern.

18. The method of claim 10, wherein generating the power managing command comprises:

retrieving the reference data from the one or more data sources using a web crawler; and generating the power managing command as a function of the reference data and device state information of the one or more device datasets.

\* \* \* \* \*